US008401163B1

(12) United States Patent
Kirchhoff et al.

(10) Patent No.: US 8,401,163 B1
(45) Date of Patent: Mar. 19, 2013

(54) METHODS AND SYSTEMS FOR CALL PROCESSING AND FOR PROVIDING CALL PROGRESS STATUS OVER A NETWORK

(75) Inventors: Leland Kirchhoff, Santa Barbara, CA (US); David Trandal, Santa Barbara, CA (US); David Giannini, Santa Barbara, CA (US)

(73) Assignee: Callwave Communications, LLC, Santa Barbara, CA (US)

( * ) Notice: Subject to any disclaimer, the term of this patent is extended or adjusted under 35 U.S.C. 154(b) by 1427 days.

(21) Appl. No.: 11/582,515

(22) Filed: Oct. 17, 2006

Related U.S. Application Data

(60) Provisional application No. 60/727,746, filed on Oct. 18, 2005.

(51) Int. Cl.
*H04M 3/42* (2006.01)
*H04M 3/493* (2006.01)
*H04L 12/66* (2006.01)
*H04W 4/14* (2009.01)
*G06F 3/00* (2006.01)

(52) U.S. Cl. .............. 379/201.01; 370/356; 379/210.01; 379/216.1; 455/414.1; 455/466; 715/700

(58) Field of Classification Search ................. 379/67.1, 379/265.09, 201.01, 201.02, 210.01, 216.01; 370/352, 353–356; 455/66.1, 414.1, 466; 715/700; 725/37
See application file for complete search history.

(56) References Cited

U.S. PATENT DOCUMENTS

| | | | |
|---|---|---|---|
| 3,936,613 A | 2/1976 | Nishigori et al. | |
| 3,956,595 A | 5/1976 | Sobanski | |
| 4,009,337 A | 2/1977 | Sakai et al. | |
| 4,022,983 A | 5/1977 | Braun et al. | |
| 4,485,470 A | 11/1984 | Reali | |
| 4,736,405 A | 4/1988 | Akiyama | |
| 4,809,321 A | 2/1989 | Morganstein et al. | |
| 4,893,336 A | 1/1990 | Wuthnow | |
| 4,994,926 A | 2/1991 | Gordon et al. | |
| 5,040,208 A | 8/1991 | Jolissaint | |
| 5,046,087 A | 9/1991 | Sakai | |
| 5,291,302 A | 3/1994 | Gordon et al. | |
| 5,404,537 A | 4/1995 | Olnowich et al. | |
| 5,434,908 A | 7/1995 | Klein | |
| 5,459,584 A | 10/1995 | Gordon et al. | |

(Continued)

FOREIGN PATENT DOCUMENTS

| | | |
|---|---|---|
| CA | 1329852 | 9/1989 |
| EP | 1 120 954 | 8/2001 |

(Continued)

OTHER PUBLICATIONS

Johnson, Dave; Article; "Now You're TALKING—voice—response systems for home offices—Product Information"; http://www.findarticles.com; Feb. 1999.

*Primary Examiner* — Harry Hong
(74) *Attorney, Agent, or Firm* — Knobbe, Martens, Olson & Bear LLP

(57) ABSTRACT

The present invention is related to telecommunications, and in particular, to methods and systems for call processing. By way of example, a first call control is visually provided via a Web page in association with search results transmitted to a user computer system, wherein the user submitted to search request to a search engine. An indication is received that the user activated the first call control. A first call is placed to a telephonic address selected by the user. A second call is placed to a telephonic address associated with the first call control. Progress information related to the second call is transmitted to the user computer system in substantially real-time.

67 Claims, 8 Drawing Sheets

U.S. PATENT DOCUMENTS

| | | | |
|---|---|---|---|
| 5,467,388 A | 11/1995 | Redd, Jr. et al. | |
| 5,526,524 A | 6/1996 | Madduri | |
| 5,533,102 A | 7/1996 | Robinson et al. | |
| 5,533,106 A | 7/1996 | Blumhardt | |
| 5,577,111 A | 11/1996 | Iida et al. | |
| 5,583,918 A | 12/1996 | Nakagawa | |
| 5,619,557 A | 4/1997 | Van Berkum | |
| 5,640,677 A | 6/1997 | Karlsson | |
| 5,651,054 A * | 7/1997 | Dunn et al. | 379/88.11 |
| 5,668,861 A | 9/1997 | Watts | |
| 5,751,795 A | 5/1998 | Hassler et al. | |
| 5,774,067 A | 6/1998 | Olnowich et al. | |
| 5,805,587 A | 9/1998 | Norris et al. | |
| 5,809,128 A | 9/1998 | McMullin | |
| 5,812,551 A | 9/1998 | Tsukazoe et al. | |
| 5,825,867 A | 10/1998 | Epler et al. | |
| 5,832,060 A | 11/1998 | Corlett et al. | |
| 5,835,573 A | 11/1998 | Dee et al. | |
| 5,894,504 A | 4/1999 | Alfred et al. | |
| 5,946,386 A | 8/1999 | Rogers et al. | |
| 5,960,064 A | 9/1999 | Foladare et al. | |
| 5,960,073 A | 9/1999 | Kikinis et al. | |
| 5,963,629 A | 10/1999 | Jung | |
| 5,995,594 A | 11/1999 | Shaffer et al. | |
| 5,995,603 A | 11/1999 | Anderson | |
| 6,014,436 A | 1/2000 | Florence et al. | |
| 6,032,051 A | 2/2000 | Hall et al. | |
| 6,034,956 A | 3/2000 | Olnowich et al. | |
| 6,035,031 A | 3/2000 | Silverman | |
| 6,044,059 A | 3/2000 | Olnowich | |
| 6,078,581 A | 6/2000 | Shtivelman et al. | |
| 6,104,800 A | 8/2000 | Benson | |
| 6,144,644 A | 11/2000 | Bajzath et al. | |
| 6,160,881 A | 12/2000 | Beyda et al. | |
| 6,167,127 A | 12/2000 | Smith et al. | |
| 6,169,795 B1 | 1/2001 | Dunn et al. | |
| 6,169,796 B1 | 1/2001 | Bauer et al. | |
| 6,175,622 B1 | 1/2001 | Chiniwala et al. | |
| 6,178,183 B1 | 1/2001 | Buskirk, Jr. | |
| 6,181,691 B1 | 1/2001 | Markgraf et al. | |
| 6,208,638 B1 | 3/2001 | Rieley et al. | |
| 6,212,261 B1 | 4/2001 | Meubus et al. | |
| 6,216,106 B1 | 4/2001 | John | |
| 6,230,009 B1 | 5/2001 | Holmes et al. | |
| 6,243,378 B1 | 6/2001 | Olnowich | |
| 6,253,249 B1 | 6/2001 | Belzile | |
| 6,278,704 B1 | 8/2001 | Creamer et al. | |
| 6,304,565 B1 | 10/2001 | Ramamurthy | |
| 6,310,939 B1 | 10/2001 | Varney | |
| 6,350,066 B1 | 2/2002 | Bobo, II | |
| 6,353,660 B1 | 3/2002 | Burger et al. | |
| 6,353,663 B1 | 3/2002 | Stevens et al. | |
| 6,363,414 B1 | 3/2002 | Nicholls et al. | |
| 6,405,035 B1 | 6/2002 | Singh | |
| 6,411,601 B1 | 6/2002 | Shaffer et al. | |
| 6,411,805 B1 | 6/2002 | Becker et al. | |
| 6,438,216 B1 | 8/2002 | Aktas | |
| 6,438,222 B1 | 8/2002 | Burg | |
| 6,477,246 B1 | 11/2002 | Dolan et al. | |
| 6,496,569 B2 | 12/2002 | Pelletier et al. | |
| 6,496,576 B2 | 12/2002 | Tanaka et al. | |
| 6,501,750 B1 | 12/2002 | Shaffer et al. | |
| 6,505,163 B1 | 1/2003 | Zhang et al. | |
| 6,510,162 B1 | 1/2003 | Fijolek et al. | |
| 6,510,417 B1 | 1/2003 | Woods et al. | |
| 6,512,930 B2 | 1/2003 | Sandegren | |
| 6,519,258 B1 | 2/2003 | Tsukazoe et al. | |
| 6,539,084 B1 | 3/2003 | Long | |
| 6,546,087 B2 | 4/2003 | Shaffer et al. | |
| 6,549,612 B2 | 4/2003 | Gifford et al. | |
| 6,553,222 B1 | 4/2003 | Weiss | |
| 6,564,264 B1 | 5/2003 | Creswell et al. | |
| 6,564,321 B2 | 5/2003 | Bobo, II | |
| 6,567,505 B1 | 5/2003 | Omori et al. | |
| 6,574,319 B2 | 6/2003 | Latter et al. | |
| 6,594,257 B1 * | 7/2003 | Doshi et al. | 370/352 |
| 6,621,892 B1 | 9/2003 | Banister et al. | |
| 6,643,034 B1 | 11/2003 | Gordon et al. | |
| 6,658,100 B1 | 12/2003 | Lund | |
| 6,661,785 B1 | 12/2003 | Zhang et al. | |
| 6,662,232 B1 | 12/2003 | Nicholls et al. | |
| 6,690,785 B1 | 2/2004 | Stelter et al. | |
| 6,751,299 B1 | 6/2004 | Brown et al. | |
| 6,775,370 B2 | 8/2004 | Burg | |
| 6,782,088 B1 | 8/2004 | Gabara | |
| 6,785,021 B1 | 8/2004 | Gordon et al. | |
| 6,792,094 B1 | 9/2004 | Kirkpatrick | |
| 6,857,074 B2 | 2/2005 | Bobo, II | |
| 6,898,275 B2 | 5/2005 | Dolan et al. | |
| 6,968,174 B1 | 11/2005 | Trandal et al. | |
| 6,999,566 B1 | 2/2006 | Eason et al. | |
| 7,003,087 B2 | 2/2006 | Spencer et al. | |
| 7,120,455 B1 | 10/2006 | Chen et al. | |
| 7,548,756 B2 | 6/2009 | Velthius et al. | |
| 7,822,188 B1 * | 10/2010 | Kirchhoff et al. | 379/211.02 |
| 2002/0009184 A1 | 1/2002 | Shnier | |
| 2002/0010616 A1 | 1/2002 | Itzhaki | |
| 2002/0097710 A1 | 7/2002 | Burg | |
| 2003/0039339 A1 | 2/2003 | Luehrig et al. | |
| 2003/0063731 A1 | 4/2003 | Woodring | |
| 2003/0123629 A1 | 7/2003 | Hussain et al. | |
| 2003/0156700 A1 | 8/2003 | Brown et al. | |
| 2003/0191823 A1 | 10/2003 | Bansal et al. | |
| 2004/0028203 A1 | 2/2004 | Wurster et al. | |
| 2004/0028213 A1 * | 2/2004 | Goss | 379/265.09 |
| 2004/0190706 A1 | 9/2004 | Fleisher, III et al. | |
| 2004/0203406 A1 * | 10/2004 | Moran et al. | 455/66.1 |
| 2004/0234064 A1 * | 11/2004 | Melideo | 379/265.09 |
| 2004/0258220 A1 | 12/2004 | Levine et al. | |
| 2005/0010573 A1 | 1/2005 | Garg | |
| 2005/0053216 A1 | 3/2005 | Spencer et al. | |
| 2005/0078612 A1 | 4/2005 | Lang | |
| 2005/0123118 A1 | 6/2005 | Terry et al. | |
| 2005/0207556 A1 | 9/2005 | Gonzalez et al. | |
| 2005/0265322 A1 * | 12/2005 | Hester | 370/352 |
| 2005/0286498 A1 | 12/2005 | Rand et al. | |
| 2005/0287993 A1 | 12/2005 | Gogic | |
| 2006/0013374 A1 | 1/2006 | Fleisher, III et al. | |
| 2007/0189267 A1 * | 8/2007 | Metcalf et al. | 370/352 |
| 2008/0071745 A1 * | 3/2008 | Clarke | 707/3 |

FOREIGN PATENT DOCUMENTS

| | | |
|---|---|---|
| EP | 1120954 | 8/2001 |
| JP | 10-513632 | 12/1998 |
| JP | 11-506292 | 6/1999 |
| JP | 2001-168989 | 6/2001 |
| WO | WO 97/26749 | 7/1997 |
| WO | WO 00 60840 | 10/2000 |
| WO | WO 01/76210 | 10/2001 |

* cited by examiner

METHODS AND SYSTEMS FOR CALL PROCESSING AND FOR PROVIDING CALL PROGRESS STATUS OVER A NETWORK

CROSS-REFERENCE TO RELATED APPLICATIONS

The present application claims priority from U.S. Patent Application No. 60/727,746, filed Oct. 18, 2005, the contents of which are incorporated herein in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to telecommunications, and in particular, to methods and systems for call processing.

2. Description of the Related Art

Many organizations engaged in telephonic communications with large numbers of customers use call centers to route calls to customer service personnel. These call centers may include workstations for customer service personnel that answer calls, as well as one or more supervisory terminals. The workstations can include a computer and telephone. Call centers are sometimes networked to corporate computer systems. Voice and data may be linked using computer telephony integration.

SUMMARY OF THE INVENTION

The present invention is related to telecommunications, and in particular, to methods and systems for call processing.

Certain embodiments described herein provide methods and systems for providing real-time call progress updates to callers via their computer or other device. Certain embodiments optionally provide called parties with the ability to transfer calls to other destinations and/or to conference in other parties.

An example embodiment provides a method of processing a call request paced via a Web page user interface, the method comprising: causing, at least in part, a first call control to be visually provided via a Web page in association with search results transmitted to a networked computer system associated with a user, wherein the search results were transmitted at least partly in response to a user search request to a search engine; receiving at a call processing system an indication that the user activated the first call control; placing a first call to a telephonic address selected by the user; placing a second call to a telephonic address associated with the first call control; and transmitting progress information related to the second call to the user computer system in substantially real-time.

An example embodiment provides a method of processing a call request, the method comprising: receiving over a network a call request placed by a user via a call control visually presented on a user terminal in association with search results, wherein the search results were transmitted to the user at least partly in response to a search request, and wherein the call request indicates that a call is to be placed; placing a first call to a user telephonic destination specified by the user at least partly in response to receiving the call request; placing a second call to a telephonic address associated with the search request; and transmitting progress information related to the second call to the user terminal in substantially real-time.

An example embodiment provides a method of processing a call request, the method comprising: receiving over a network a call request placed by a user via a call control visually presented on a user terminal, wherein the call request indicates that a call is to be placed; at least partly in response to receiving the call request, placing a first call to a user telephonic destination specified by and associated with the user at least partly in response to receiving the call request; placing a second call to a telephonic address associated with the call; and transmitting progress information related to the second call to the user terminal in substantially real-time, wherein at least a portion of the progress information is displayed to the user.

DETAILED DESCRIPTION OF PREFERRED EMBODIMENTS

Figure 1:
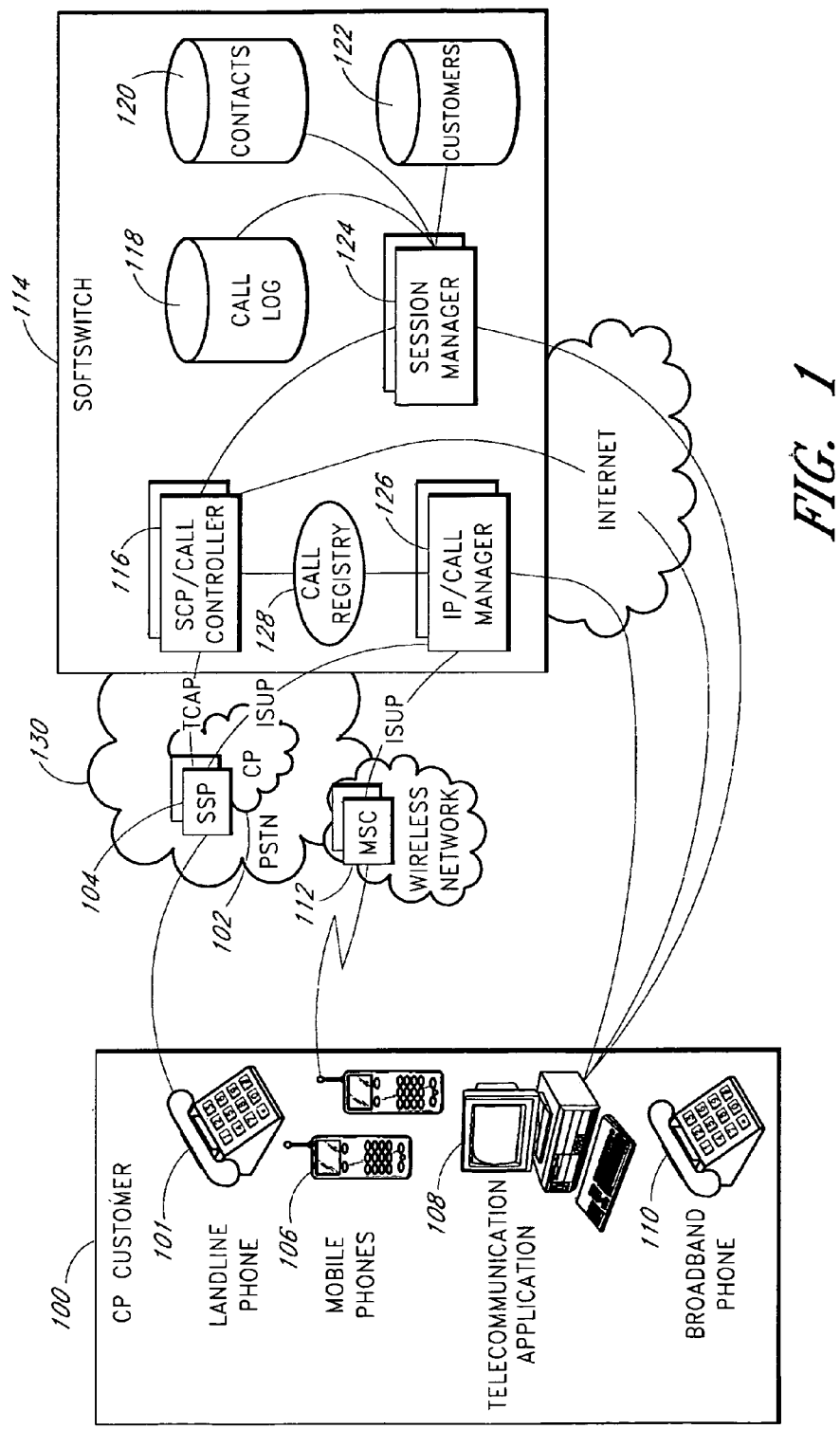
FIG. 1 illustrates an example network operating environment in which enhanced telecommunications services are provided.

The present invention is related to telecommunications, and in particular, to methods and systems for call processing.

As discussed above, many organizations engaged in telephonic communications with large numbers of customers use call centers to route calls to customer service personnel. However, often there are insufficient agents available to handle incoming calls, and so callers are queued until an agent becomes available to handle the given caller. This can be a frustrating experience for callers, who do not know when their calls will be handled by an agent. Further, callers often waste a great deal of time waiting at the phone until their call is answered.

Certain embodiments described herein provide methods and systems for providing real-time call progress updates to callers via their computer or other device, thereby reducing caller frustration.

In an example embodiment, a user can initiate a call to a party, such as a merchant via a Web page. For example, a user can click on an advertisement (e.g., an advertisement displayed on a Web page that includes search results displayed in response to a user search request) in order to connect with the merchant (or its agent or representative), wherein the call is optionally connected to a user telephone selected by the user (e.g., via a menu of call destinations, such as phone addresses, or nicknames for the same, associated with the user).

Optionally, the user initiating the call and the merchant receiving the call are provided with enhanced call handling experiences as compared to many conventional systems. In an example embodiment, enhanced call handling experiences are achieved, at least in part, by routing such calls through a switch, such as a softswitch (e.g., which connects calls from one phone line to another, using, for example, software running on a computer system).

Optionally, the softswitch includes a call agent and a media gateway. For example, the call agent can be configured to manage some of all of the following: call routing, signaling, call services, billing, etc. By way of further example, the media gateway can be configured to connect different types of digital media stream to create path for the media (e.g., voice and data) in the call). The media gateway optionally includes interfaces to one or more PSTN networks, wireless networks, IP networks, ATM networks, Ethernet networks. For example, certain interfaces can be used to connect VoIP calls. The call agent can instruct the media gateway to connect media streams between these interfaces to connect the call. A call agent can optionally manage several media gateways. Routing calls between a user and merchant through a softswitch enables a call endpoint to be PSTN or SIP-based, by way of example.

The softswitch can be provided or operated by a carrier and/or a third party provider of enhanced services. The switch can be used to redirect calls appropriately for the merchant and transmit feedback to the user regarding the progress being made with respect to reaching the merchant. Optionally, a user interface is provided to the user which presents user-selectable options with respect to taking alternative call actions.

While the following description refers to example Web page, network and telephony standards and protocols, other standards and protocols can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system, other computer or electronic systems can be used as well, such as, without limitation, an interactive television, a networked-enabled personal digital assistant (PDA), a networked game console, a networked entertainment device, and so on. While certain references are made to CallWave and Google system components or services, non-CallWave and non-Google components and services can be used as well. Further, while certain of the following examples are discussed with respect to business users, the processes and systems described herein can similarly be used by individual, personal users. In addition, while certain user inputs are described as being provided via keypresses or by clicking on a button, optionally, user inputs can be provides using other techniques, such as by voice or otherwise. Further, while example user interface language is described herein, other language or scripts can be used as well. While certain phone numbers are referenced for purposes of illustration, other phone numbers or electronic addresses or locators can be used as well.

GLOSSARY

AA Automated Attendant
AIN Advanced Intelligent Network
BCM Business Call Management
BS Base Station
HLR Home Location Register
IP Internet Protocol
ISUP ISDN User Part
IT Information Technology
LNP Local Number Portability
MA Mobile Answering
MFI Mobile/Fixed Incall
MFON Mobile/Fixed One-Number
MMS Multimedia Message Service
MSC Mobile Switching Center
MVNO Mobile Virtual Network Operator
PSTN Public Switched Telephone Network
RTP Real Time Transport Protocol
SIP Session Initiation Protocol
SMS Short Message Service
TCAP Transaction Capabilities Application Part
VLR Visitor Location Register
VoIP Voice over IP FIG. 1 illustrates an example telecommunications network environment via which enhanced services can be provided.

A service provider or carrier (e.g., a Carrier Partner) customer 100 may have one or more landline phones 101 that connect to a local exchange switch or an SSP (Service Switching Point) 104 in the carrier's network 102. The customer may also have one or more mobile phones 106 and one or more hosts 108 (e.g., personal computers, networked televisions, personal digital assistants, smart phone, etc.) running a telecommunications client. In addition, a customer may have one or more phones 110 connected to a broadband connection (e.g., via a cable modem or DSL modem) wherein the phone (e.g., an analog phone coupled to an analog phone adapter (ATA), a VoIP phone, a Skype phone, etc.) digitizes and packetizes voice data before transmitting over the broadband connection (e.g., using SIP or other protocol) to a call routing service provider or other destination.

The telecommunications client has one or more user interfaces that display some or all of the following: a call log, text messages, a contact record/list, an optional automated character, and active, in-progress calls. In an example embodiment, the customer can elect to screen or take an active call or respond to a caller with a message that will be viewable by the caller, such as a text message or a multimedia message (e.g., an SMS message or MMS message). Optionally, calls can also be made (originated) via the telecommunications client (e.g., where the host is equipped with a speaker and microphone). Optionally, information about a caller can be retrieved through a search function (e.g., wherein information regarding the caller is searched for over the Internet and/or via proprietary databases, such as databases reflecting an individual's or company's credit worthiness).

In this example, the softswitch 114 has a number of optional components, some of which are optionally centralized at a given location, others of which may be co-located in the carrier's network (e.g., to reduce network transport costs).

A SCP (Service Control Point) 116 is an optional AIN component that interacts with the SSPs (e.g., using the TCAP protocol). In an example embodiment, triggers, such as AIN triggers, are armed for the customer's phone number/address/account (e.g., landline phone line) so that when calls are made to or from a corresponding phone, a trigger fires and causes the SSP to query the SCP 116 for instructions on how to handle the call. The SCP 116 is optionally also configured to perform TCAP queries to other SS7 components as needed by some services (e.g., request Automatic Callback from another carrier's switch when a line becomes idle).

In an example non-AIN deployment, the softswitch 114 optionally interconnects with the PSTN 130 using, by way of example, SS7 signaling. In this case, in an example embodiment, the SS7 signaling information associated with a call terminates on a Call Controller subsystem 116 or the like, and the trunks (or bearer channels) terminate on one or more Call Managers (described further below). Optionally, the Call Controller subsystem and/or associated functions thereof, are included in the Call Manager subsystem.

In an example IP (e.g., VoIP) deployment scenario, the softswitch 114 interconnects with the PSTN 130 through an IP connection using, for example, Session Initiated Protocol (SIP) signaling. The IP network is optionally directly connected to Internet devices or calls are gatewayed from IP-to-PSTN at Network Points-of-Presence (NetPOP) which provide access points to the Internet.

In an example embodiment, triggers, such as SS7 Wireless Intelligent Network (WIN) triggers, are set in the mobile switches of one or more wireless carriers (e.g., Wireless Carrier Partners) to provide similar calling services as described herein with respect to a landline phone for a customer's mobile phone number/address/account.

In an example embodiment, the softswitch 114 also contains one or more systems referred to as Call Managers. The Call Managers are connected to the PSTN 130 (e.g., via ISDN using the ISUP protocol, by way of example, although other protocols can be used). The Call Managers provide some or all of the following: provide a call screening service when screening is to be provided, record a message from a caller that is to be recorded, provide a voice prompt or message that is to be played to a caller and/or called party, record a facsimile document, detect speech or DTMF tones, convert speech that needs to be converted to text, and/or provide a gateway between the SS7-based networks (PSTN) and SIP-based networks (VoIP). The example Call Manager optionally can also act as an IP (Intelligent Peripheral), another AIN component that the SCP can instruct the SSP to connect into the call for interaction with the called and calling party. The IP/Call Managers and SCPs in the softswitch optionally share a Call Registry that stores information about active calls.

One or more Session Managers 124 (e.g., in the softswitch 130) optionally track telecommunication client presence and interact with a given telecommunications client (e.g., a client application hosted on a personal computer, PDA, smart phone, or a networked television) as call log, contact, and/or customer data needs to be synchronized with one or more databases (e.g., centralized or distributed databases, such as a call log database, 118, a contacts database 120, and/or a customers database 122) to provide the customer, via the client, with updated log, contact, and/or customer data.

The Session Manager(s) 124 also optionally provide the SCP in an AIN environment and the Call Manager in a non-AIN environment with service configuration information for the customer involved in a call. During an active call, the SCP 116 and/or IP/Call Manager optionally directly or indirectly interact with the telecommunications client to provide call progress information, and to stream audio and/or visual content.

The softswitch 114 in this example contains centralized databases and/or a general-purpose storage area, optionally including, but not limited to, some or all of the following: a call log database 118, a contacts database 120, and a customer database 122. Optionally, the databases are not centralized and may be distributed geographically and/or over different systems. The call log database 118 stores call events and related data for incoming and/or outgoing calls and text and/or multimedia messages. The contacts database 120 stores information and parameters (e.g., names, identifiers, and/or phone numbers/addresses, birthdays, notes, automated characters, etc.) associated with a sender, called, or calling party. The customer database 122 stores information and parameters (e.g., account data and configuration information) associated with subscribers/customers/users.

The softswitch call processing system 114 optionally includes other subsystems (not shown), such as some or all of the following: a router subsystem, which serves as an interface to the Internet to manage communications between online IP client devices and call processing servers, a web server subsystem to manage a "web site" associated with the softswitch (e.g., via which a user can access an account set-up/configuration user interface, a call log, a contacts database, etc., using a browser or other network user interface), etc. These subsystems are optionally interconnected via a Local Area Network (LAN), a Wide Area Private Network (WAN), and/or a Wide Area Public Network (e.g., Internet).

Internet protocol telephony, such as VoIP (voice over Internet protocol), may use, in whole or in part, the Session Initiation Protocol (SIP) as the signaling protocol. SIP is a standardized signaling protocol which can be used for Internet conferencing, telephony, presence, events notification and instant messaging. The Session Initiation Protocol is currently an Internet Engineering Task Force (IETF) standard protocol. There may be several versions and implementations of SIP. SIP, by way of example, enables one or more of the following services to be provided, using proxy servers and end user client systems:

1. Call forwarding: call forwarding can be provided in response to one or more of the following conditions: ring-no answer, busy, unconditional call forwarding, address manipulations (such as permanent numbers (e.g., 700 numbers), free phone numbers (e.g., 800, 866 numbers), and paid information numbers (e.g., 900 numbers)).
2. Call recipient and calling number identification
3. Personal mobility
4. Caller and call recipient authentication
5. Invitations to a multicast conference
6. Basic Automatic Call Distribution (ACD)

A call may be routed partially over the Internet, using SIP, and partially over a circuit-switched network, such as a PSTN (public switched telephone network) or wireless network. The PSTN and wireless networks may utilize a variety of signaling and other standards, such as the SS7 signaling protocol.

SIP is a request-response protocol. In one embodiment, SIP can be used for establishing, manipulating and tearing down user sessions, wherein several users can optionally participate in a session. A session can optionally involve multimedia elements including audio, video, instant messaging, and/or other real-time data communications. By way of further example, a session can be an Internet multimedia conference, an Internet telephone call and/or a multimedia distribution session. Optionally, session members can communicate using multicast and/or using a mesh of unicast relations.

SIP can optionally run over UDP (User Datagram Protocol), TCP, IP, ATM, X.25 and/or other protocols. In one embodiment, SIP can work in the Application layer of the Open Systems Interconnection (OSI) communications model.

By way of example, SIP invitations can be used to create sessions. The invitation can carry session descriptions that enable participants to agree on a set of compatible media types. SIP enables user mobility by providing proxy services and redirecting requests to the user's current location. For example, users can register their current location so that calls can be directed to a telephone or other terminal corresponding to the location.

An example system that can be used to support SIP can include some or all of the following components:
1. An endpoint component, sometimes referred to as a user agent (UA), which can be a hardware and/or software device implementing or compatible with SIP, such as an Internet Protocol (IP) phone or other terminal. The endpoint components can include a client used to initiate calls and a server used to answer calls. By way of further example, a SIP Proxy, a SIP phone, a call processing system, and so on, can be SIP endpoints.
2. A SIP network server that handles signaling associated with one or more calls. By way of example, in an optional embodiment, the network server provides name resolution and user location. The SIP network server can include one or more additional servers. For example, the SIP server can include a Register server used to receive registration messages from endpoints regarding current user location. Using a mapping database, the Register server can map the SIP addresses with the physical location or locations in the domain where the endpoint is located. The SIP network server can also include a proxy system that transmits call setup and tear down information and optionally forwards SIP messages to multiple proxy servers, creating a search tree, in order for the SIP messages to reach their destination. In addition, a SIP proxy can discover endpoint characteristics of an endpoint by consulting a list of registration templates, including dynamic configuration parameters, for that endpoint. The network server can also include a SIP Redirect server that enables endpoints to locate a desired address by redirecting one or more of the endpoint to another server.

SIP addresses can be the form of uniform resource locators (URL). By way of example, SIP addresses can optionally be embedded in Web pages. In certain applications, a user can click on a SIP address embedded in a Web or other electronic document, and in response, a call can be placed from the user terminal to the SIP address, and the user can then talk to the person or system associated with the SIP address and/or send data files to the person or system associated with the SIP address.

When making a SIP call using a SIP terminal, the SIP terminal locates the appropriate server and then sends a SIP request, such as an invitation that initiates a session. The request may directly reach the intended call recipient, or the request may be redirected or may trigger a chain of new SIP requests by proxies. If a call is to be routed through a number of different proxy servers, a redirect server can be used. When a caller's user agent sends an INVITE request to the redirect server, the redirect server contacts the location server to determine the path to the called party, and then the redirect server sends that information back to the caller. The caller terminal then acknowledges receipt of the information. The caller terminal then sends a request to the device indicated in the redirection information (which could be the call recipient terminal or another server that will forward the request). Once the request reaches the call recipient terminal, the recipient terminal transmits a response and the caller acknowledges the response.

The Real Time Protocol (RTP), Real Time Control Protocol (RTCP), and/or other appropriate protocols can be used to send audio using packets over the Internet to allow the caller and call recipient to verbally communicate. By way of example, the packets can optionally be UDP packets.

Optionally, calls directed to one more selected numbers can be routed by a SIP provider to a call processing system optionally operated by a separate entity than the SIP provider. The call processing system can provide telephone services by integrating with one or more Internet Services Providers (ISP), SIP providers and/or other telephony providers.

FIG. 2 illustrates example process states in which a user performs a search (e.g., an Internet search of Internet sites, and/or a local search of the user's local computer drives or local network using a search engine). For example, the user can enter one or more search terms into one or more search fields of a search user interface (e.g., a Web page) associated with one or more search engines. The search terms are transmitted over a network (e.g., the Internet) to the search engine server. The search engine server locates search results (e.g., using a search index of Web sites, files, and/or other potential search targets) corresponding to the user's search terms. Search results are transmitted and presented to the user (e.g., on the user's terminal display), wherein those search results that are determined to more closely correspond to the search terms are presented first or higher in the search results listings.

The search results may include advertisements, such as merchant sponsored advertisements. The advertisements may correspond to or be related to the user's search terms. By way of example, a merchant can be an individual proprietor, a small business with multiple employees, a larger corporation, a non-profit organization, or other entity. The merchant may be charged for having the advertisement included in the search results, when a user clicks on an associated call merchant control, and/or when the user is connected to the merchant.

The advertisement(s) may be placed in the search engine's natural search index and displayed as part of the general search results (paid inclusion) or the advertisement(s) may be displayed aside from the search results (e.g., above, below, or on the left/right sides of the search results). For example, the search results illustrated in FIG. 3C include paid inclusion advertisements 300C, which in this example, are highlighted and displayed at the top/beginning of the search results. Other search results 304C are provided below. In addition, advertisements are displayed in a "sponsored links" area 306C. One or more of the advertisements may be associated with a call or communication initiation control, such as a button (e.g., a click-to-talk button) 302C or link that causes a call to be initiated to the merchant when clicked on or otherwise appropriately selected as shown in the example illustrated in FIG. 3C. The communication initiation control can have an embedded SIP address.

Optionally, activation of the communication initiation control enables a substantially instant telephonic connection to the merchant (e.g., if the merchant is available) via a communications network (e.g., via one or more of the PSTN, an IP network, a VoIP network, a wireless network, or other network). The call request is optionally routed through a service provider system (e.g., a softswitch) to give the merchant and the user enhanced functionality as illustrated by the scenario illustrated in FIG. 2 and discussed below.

The softswitch can initiate a call to a terminal (e.g., a landline phone, a wireless phone, an IP phone, or other telecommunication destination) selected by the user (e.g., selected in real-time or previously selected via an account configuration user interface). The softswitch can place a call to a phone address associated with the merchant. In this example, the call is placed over an IP network through a merchant firewall, to an IP communication device (e.g., a VoIP-equipped computer system) although other destinations can be associated with the call request (e.g., a PSTN landline phone, a mobile phone, etc.). In response to a "no answer" condition to the call placed to the merchant, optionally the call is transferred to one or more other telecommunication devices (e.g., a landline phone and/or wireless phone associated with an agent of the merchant). Once the call to the merchant is answered, the calls to the user and merchant are bridged (optionally, the calls can be bridged earlier so that the user hears the merchant phone ringing). Optionally, call status information (e.g., regarding the calls placed to the merchant) is continuously or periodically provided to the user via the user computer terminal, the user phone terminal, or otherwise.

Optionally, the user is a registered user/subscriber of services offered by a provider, such as of services offered via the softswitch. As part of the registration process the user may provide user information, such as name, email, physical address, billing/charge information (e.g., a billing address and/or a credit card number), and one or more phone addresses associated with the user and corresponding categorization information (e.g., some or all of the following: work phone address, home phone address, VoIP phone address, mobile phone address, SMS address, instant messaging address, etc.). The user is optionally associated with a networked terminal (e.g., a personal computer, interactive television, browser equipped phone, personal digital assistant, etc.) hosting a telecommunications client application and/or a browser that provides access to a program that provides similar functionality with respect to certain functions.

In an example embodiment, when a user or subscriber connects to the Internet using, for example, a dial-up ISP, the client application executing on the subscriber's computer terminal makes the subscriber's online presence known to the call processing system/softswitch. Presence detection is optionally performed by the call processing system polling or pinging the computer terminal via the telecommunications client application, or by the telecommunications client application transmitting a "Login/I'm alive" message and subsequent periodic "keep alive" messages to the call processing system. Just prior to the normal termination of the online Internet session, the client application optionally sends a "Logout" message to the call processing system.

If, rather than using a dial-up connection, the user or subscriber is using a broadband connection, such as a DSL line or cable modem, the client application optionally becomes active when the subscriber computer is turned on or powered up (or in response to a user manually activating the client application) and stays on until the user manually shuts down the client application, or the computer is turned off or powered down.

The subscriber can install the telecommunications client for use on more than one computer-based system (e.g., a work computer, a laptop, a home computer, an entertainment system, a smart phone hosting an appropriate operating system, such as Windows mobile, Linux, Palm OS, or other compatible operating system). Optionally, multiple instances of the telecommunications client can be simultaneously online with the softswitch. The telecommunications client can be used to manage a user's phone calls. Optionally, the online instances of the client are notified by the softswitch of an incoming call and are presented with the call. Similarly, online instances of the client are optionally synchronized by the softswitch with call or contact updates.

The telecommunications client application is used to provide and display some or all of the following: call and message information (e.g., information regarding incoming calls, call logs), contact information via a contact database/electronic address book (e.g., including some or all of the following: name, title, company, phone number(s), instant messaging address, email address, etc.), information regarding credits or bonuses earned by the user (e.g., wireless phone calling minutes earned as a result of callers calling the user, earned as a result of invitations from the user to others to subscribe to call managing services, earned as a result of invitation acceptances, etc.), or the bonuses redeemed by the user. Some or all of the information and functions available via the telecommunications client or optionally available via Web pages hosted by the softswitch or other system and which can be accessed via a browser. For example the softswitch can host a Web site via which a user can perform account registration, configuration, and access call logs, a contacts database, etc.

By way of example, the telecommunications client enables a user to listen to recorded messages to provide call handling instructions to the call processing system (e.g., take the call, forward the call, place a conference call, take a message, refuse the call, etc.). Thus, the telecommunications client is available to the user for viewing calls and contacts (e.g., via a tabbed display).

The user's call log is displayed in response to a user action (e.g., when a Calls tab is selected on the telecommunications client user interface). The user's call lists calls that were received by the softswitch (e.g., call forwarded from the user's mobile phone to the softswitch). In an example embodiment, the most recent call is listed first and any new, unreviewed calls are highlighted or otherwise identified or emphasized. Some or all of the following information is displayed for a given call: name (e.g., the name associated with the caller phone number in the user's contact list, if available; the caller's name, if available from the call signaling information; otherwise "Unknown", where "Unknown" optionally appears as a link and when clicked opens the edit contact window with some or all of the call's signaling information displayed in pre-populated fields), phone number from the CallerID signaling field (or, if the call signaling information indicates that the call is designated as private, "Private" is displayed, or if callerID information is unavailable, "Unknown is displayed), call outcome (e.g., if the caller left a message, an indication that a message was left and a message duration, if the caller was connected to the user, an indication that the connection was made and the call duration, otherwise, a no message left indication is provided), and the local date/time of call (optionally including a time zone indicator).

Figure 4:
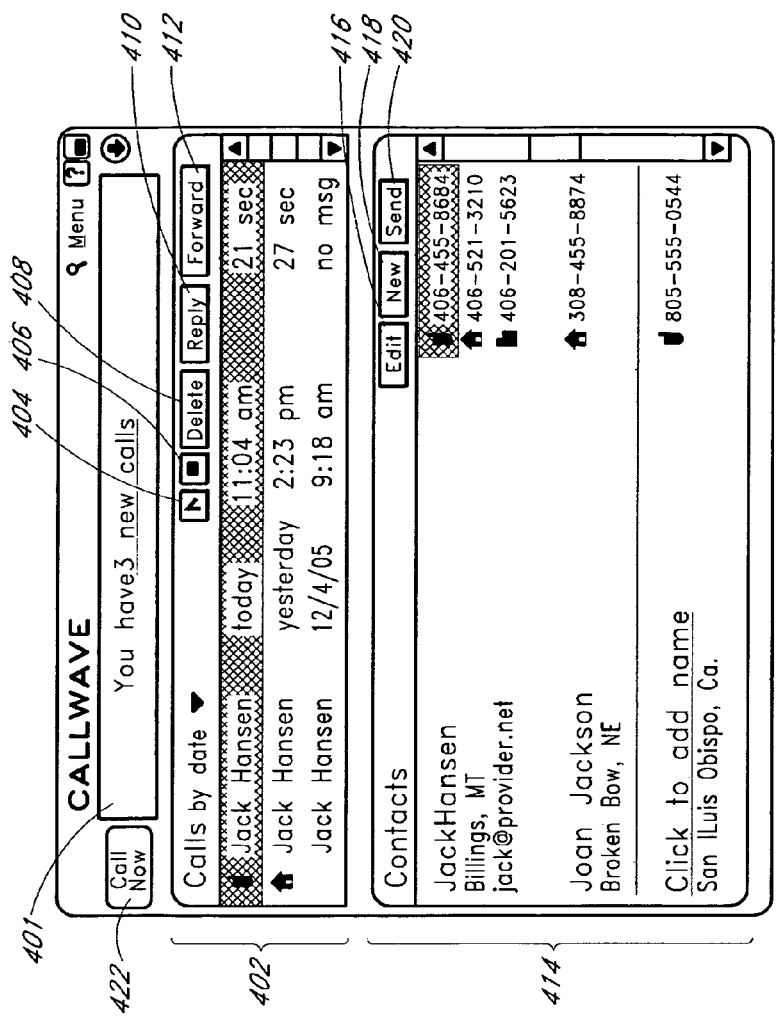
FIG. 4 illustrates a first example telecommunications client call log and user contacts user interface.

An example telecommunications client providing a call log 402 and a contacts user interface 414 is shown in FIG. 4. In this example, a first area 401, informs the user how many new calls the user has received (e.g., since the user last logged in). The call log 402 in this example includes the name of the caller (if available) as obtained using call signaling information (e.g., callerID) or otherwise, the date of the call (e.g., "today", "yesterday", or the date including the month, day, and year), the time of the call, and the length of the message left by the caller (e.g., the message length in seconds/minutes, or a no message indication if no message was left). Less, more, and/or different information can be provided and displayed as well.

Figure 5:
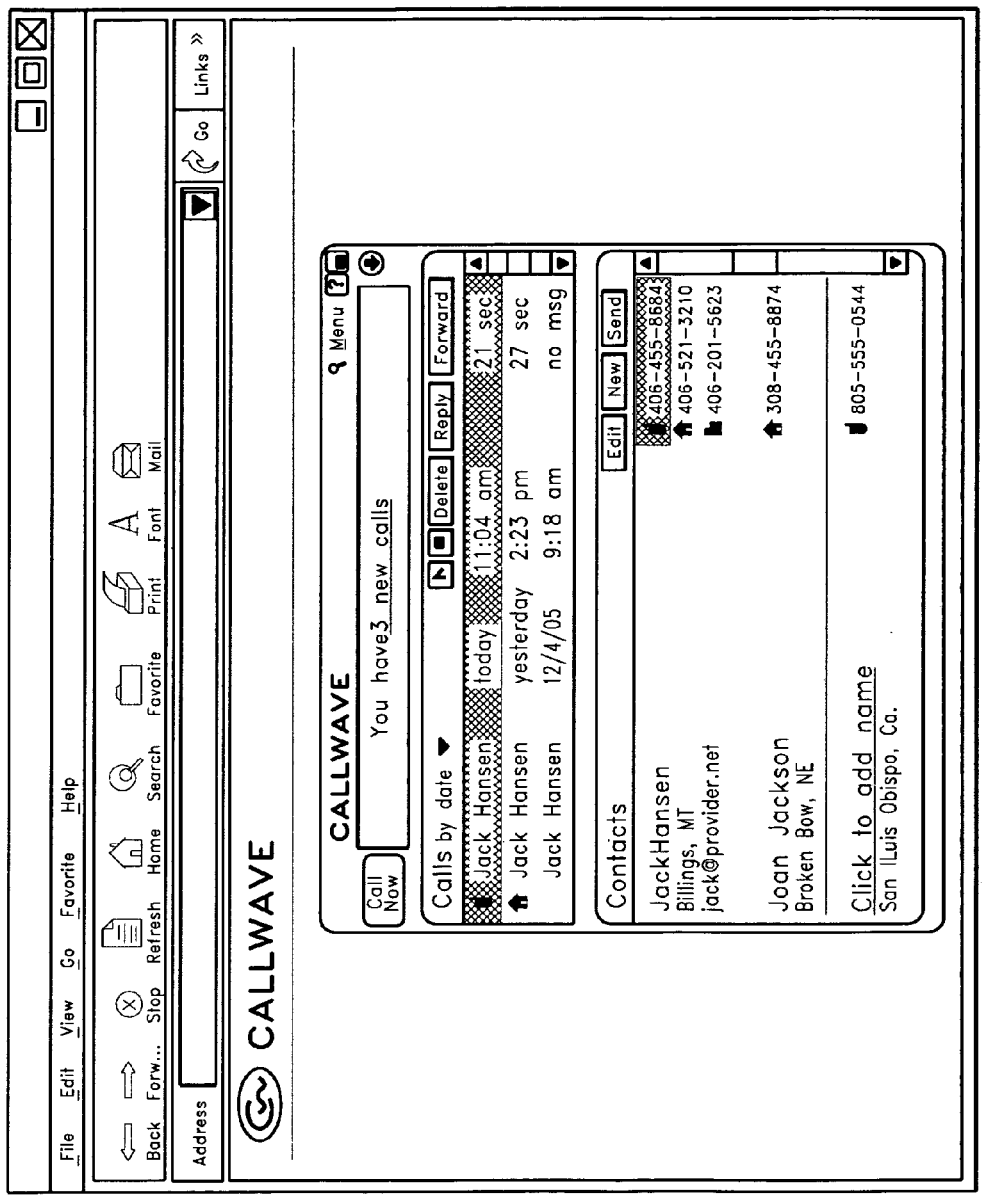
FIG. 5 illustrates a second example user interface of a call log and user contacts interface displayed via a browser.

A play caller message control 404 (which when activated by the user causes a caller message to be played back on the host) and a stop/pause message playback control 406 are optionally provided. In addition, optionally, a delete log entry control 408, a reply to caller (e.g., via a text or multimedia message) control 410, and/or a forward caller message (and/or log entry) control 412 are provided. The contact user interface can list one or more contacts of the user (e.g., including some or all of the following: contact name; contact location, contact email address, one or more contact phone addresses, a designation for one or more of the phone addresses indicated if the phone address is a mobile phone address, a home phone address, a work phone address, an IP phone address, or a fax phone address). An edit contact record control 416, a create new contact record control 418, and a send contact record control 420 are optionally provided. Examples of certain of such controls are described below. A second example telecommunication client, with call log and contacts accessed and displayed via a Web browser, is shown in FIG. 5.

Clicking on or otherwise moving a cursor to a call entry in an example call log selects the call, and then applicable button controls then apply to that call. Optionally, the first time the call log is displayed in a given session, the first (most recent) call is selected by default. Optionally, when switching between call log and contacts user interfaces, the previously selected call is remembered and redisplayed when the call log is again selected.

If a message (e.g., a recorded message from a caller) is associated with the call, the message can be played by clicking on a Play button (e.g., control 404). While a call is playing, optionally a sliding cursor shows play progress. Playing can be stopped at a desired point by clicking a stop/pause button (e.g., control 406), or a play cursor can be repositioned to restart play at another point. Optionally, call volume can be adjusted via a client application call control and/or via a separate operating system or other volume control.

A Delete control (e.g., delete control 408) is provided, which, when activated, causes the deletion of a call log entry. An Undo control is optionally provided, which, when activated can undelete previously deleted calls (e.g., up to a certain limit, such as the last 10 deleted calls).

A Forward control (e.g., control 412) is optionally provided, which, when activated causes information regarding the currently selected call to be forwarded to a designated recipient (e.g., via email, SMS, MMS, instant messaging, etc.). Activating the Forward control optionally causes a drop down list of the user's contacts, or a portion thereof, to be displayed. Optionally, the user contacts are listed alphabetically by name, and optionally contact entries without a name are excluded or listed after those entries with a name.

A Reply control (e.g., control 410) is optionally provided, which, when activated causes, by way of example, a text message field and/or a multimedia message field to be presented to the user into which the user can enter a reply message (e.g., text or multimedia). The message address field will optionally be pre-populated with the name/address of a selected call log entry. Optionally, if the reply is to a cell phone message, the default prepopulated address field can be the caller's SMS or MMS address. Optionally, the address field can be overwritten by the sender or an email address stored in the caller's contact record can be used.

A Send control is optionally provided, which, when activated causes, by way of example, a text message field to be presented to the user into which the user can enter a text or multimedia message. The message address field can be pre-populated with the name/address of a selected call log entry or contact.

An Invite button control provided is provided (optionally, when the contact has not yet been sent an email or other electronic invitation via the softswitch to try certain services (e.g., TYF email or other electronic communication) to the given address (e.g., email address) or if the address is blank; if an invitation had previously been sent, a Reinvite control is optionally provided. Optionally, users who click on or otherwise activate the Invite button control for a blank email address are asked to enter an email address first; otherwise, both Invite and Reinvite display a TYF form with this entry's email address pre-populated.

The user's call log is optionally stored on the user's computer and is available when the application client is offline. As similarly discussed elsewhere herein, the call log stored on the user's computer is synchronized with the softswitch when the telecommunications client logs in to the softswitch, and synchronization is optionally periodically performed while online (e.g., every minute, every two minutes, or at other interval) while the client is online.

Optionally, when an incoming call is received, the telecommunications client is automatically maximized or increased in size if it is currently minimized, the information about the caller (e.g., name, phone number, and/or city/state) is displayed, and the message being left by the caller is played, unless the speaker mute control is activated, as discussed below. When the call completes, the call is optionally displayed as the first call in the call log and it is highlighted or otherwise emphasized (e.g., via a new call icon) to indicate it is a new call. Optionally, an indication is provided (e.g., via a blinking icon) that new calls have been received until the indicator is clicked on or the new calls in the call log are clicked.

If incoming calls are received by the softswitch when a telecommunications client is offline, when the telecommunications client goes online and a session is established with the softswitch, information related to those incoming calls is transmitted by the softswitch to the client. The call information for the calls is optionally displayed at the top of the call log (or at another designated position) with highlighting or other indicator that indicates the calls are new calls, and optionally, an icon is blinked or otherwise emphasized to indicate that new calls have been received.

Optionally, the telecommunications client has a user accessible control (e.g., with a speaker icon) for muting telecommunications sound signals that would otherwise be produced by the host computer speaker. When clicked on or depressed, sound from the client application to the speaker is muted, and when not depressed or when clicked on again, the sound is unmuted. Optionally, the user can control the default state/position of the mute control for incoming calls (e.g., via the option setting "Enable speaker during incoming calls"). Optionally, by default the client application sound to the speaker is not muted for incoming calls. If the user clicks on a message entry in a call log to play the message (or otherwise activates a play message control), optionally the mute control automatically changes to the unmuted position/state, and again changes to its specified default position/state if an incoming call is received. The mute control can be clicked while playing a message or receiving a call to change the speaker/mute behavior.

Optionally, the user telecommunications client includes a user interface which enables the user to specify/select what user information should or should not be transmitted to a merchant (e.g., as a result of activating on a communication initiation link in a merchant advertisement). For example, the user interface may list certain categories of user information (e.g., one or more of the following: name, phone address, mailing address, city, state country, email address), which may be associated with a corresponding "do not provide to merchants" or "provide to merchants" check boxes or other control. Optionally, the user can specify that the client application should request user authorization each time before sending the user information to a merchant.

The merchant may likewise have one or more telecommunication clients hosted on one or more work stations (e.g., computer terminals with a VoIP phone or a POTs/PBX phone). The clients may be networked to the softswitch. The merchant client may have some or all of the capabilities of the user telecommunications client and optionally include other capabilities as well. For example, the merchant optionally includes an interface that displays information regarding a user that clicked on an advertisement (e.g., one or more of the following: name, phone address, mailing address, city, state country, email address). The information, by way of example, can be received from the user telecommunications client application via the softswitch, or directly from the softswitch. Optionally, the merchant telecommunications client application can display the Web page the user was viewing when the user activated the link that initiated the communication with the merchant.

Optionally, the agent's client application stores a list of the agent's contacts. The contact information optionally includes the contact name, postal address, email address, and/or phone address(es). The contact list can be used by the agent when making or transferring calls, as similarly described below. As similarly described below, because a call that is taken by a merchant agent is routed through a softswitch, the agent can control from the phone additional routing actions for that call via the merchant client application. These actions are optionally similar to the call control provided via the user's telecommunications application or may be more limited in scope.

When a user activates the communication initiation control (sometimes referred to as a "click-to-talk" control), the call is optionally performed in bridged fashion wherein the softswitch first calls the user and then the merchant, and bridges the two outcalls together once they are answered. In other embodiments, the merchant could be called first then the user. Optionally, outcalls can be placed to the user and merchant at the same time, and when the two outcalls are answered, the calls are then bridged so that the user and merchant can converse.

In yet another example embodiment, a web server (e.g., a subsystem of the softswitch) transmits a message to a client application, such as Google Talk or Skype, running on the user's terminal, to cause the user terminal to originate the call (e.g., over a VoIP network or, using a modem, over the PSTN). After clicking on the communication initiation control, the user's telecommunication client application interface presents a dialog to the user to select the phone/address the user wishes to use for the call (see FIGS. 3A-B). For example, the user can have one or more of the following configured in their list of phones and/or the corresponding phone addresses:

Google Talk client (or other voice communications client) hosted on the user's terminal (e.g., personal computer)

SIP Federation addressable phone

Home landline PSTN-based phone

Work landline PSTN-based phone

Mobile phone

Phone behind a PBX/Auto-Attendant, i.e., with a dialable extension

Other communication terminals/clients

The user can choose one of her/his phones as the default (e.g., via an account management Web page and/or user interface presented via the client application), wherein the user's selection is stored in computer readable memory (e.g., on the user's terminal and/or the softswitch).

Figure 3A:
FIGS. 3A-B illustrates example user interfaces.
Figure 3B:
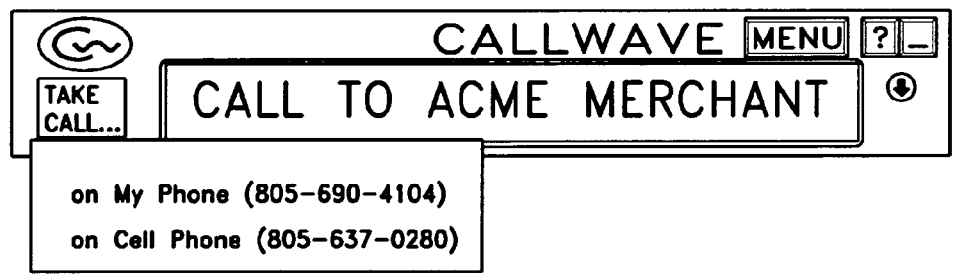
Figure 3C:
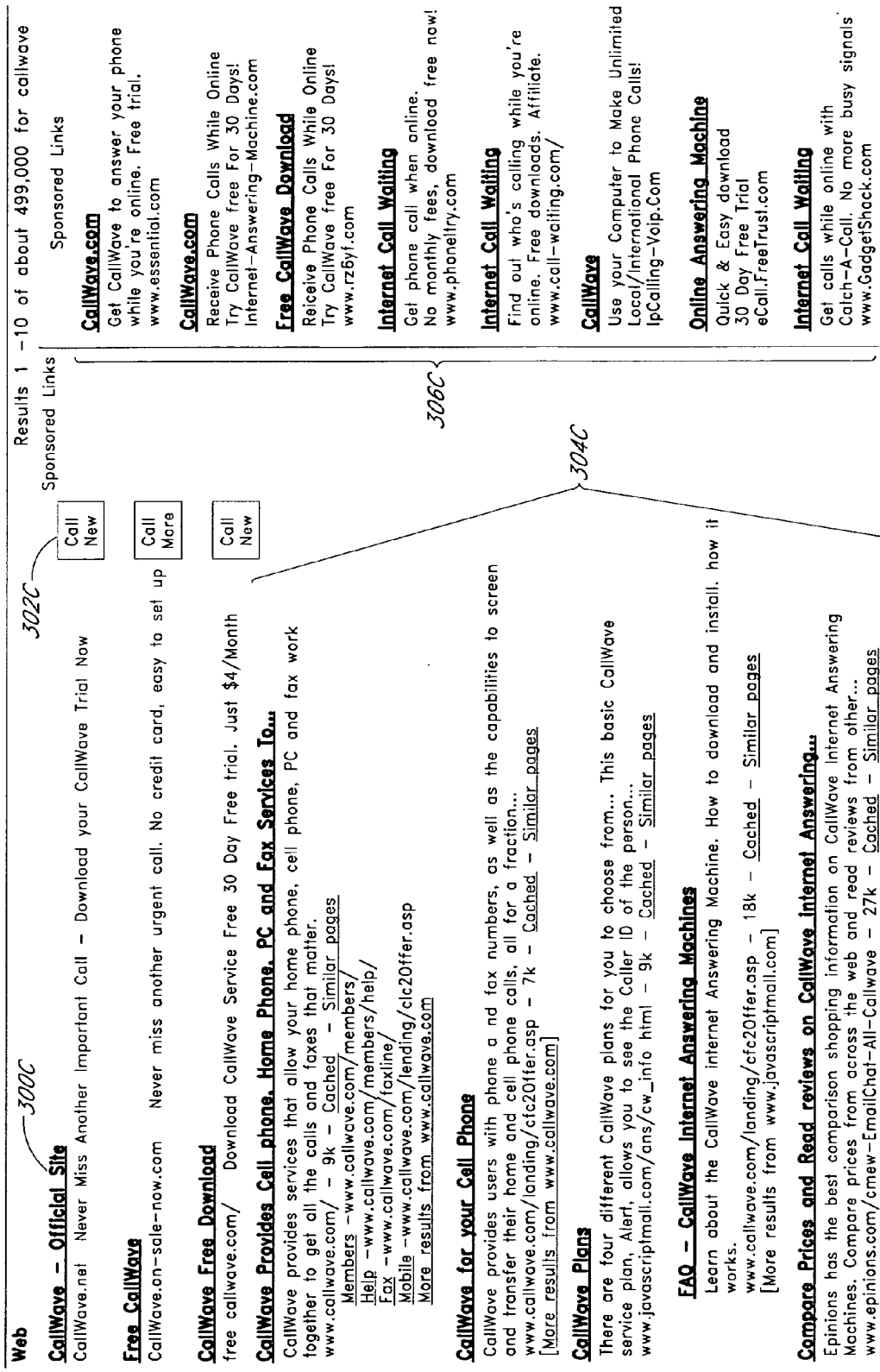
FIG. 3C illustrates an example user interface with a call initiation control.

FIG. 3A illustrates an example-user interface that can be presented via a telecommunications client application and/or via a browser. In this example, the user interface displays a message ("ready for calls") that indicates when the client application is ready to place or receive calls. FIG. 3B illustrates the user interface of FIG. 3A, except in this example, a choice of telephonic devices is displayed via which the user can instruct the softswitch as to where the subscriber wants to take the call (e.g., "my phone (805-690-4104)", "on cell phone (805-637-0280).

Figure 6:
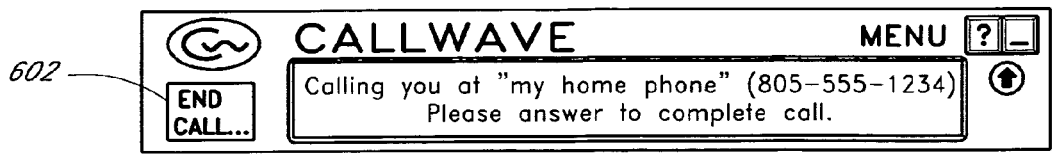
FIG. 6 illustrates an example telecommunication client displaying the progress of a call to a merchant.

After selecting the phone or phone address the user wants to take the call, the user is optionally presented a call progress dialog and/or graphic via the client application or a Web page on the user's computer screen. For example, the dialog can identify the user phone terminal (e.g., mobile phone, home phone, work phone, IP phone, etc.) and/or address to which the call will be placed. With reference to the example user interface illustrated in FIG. 6, an example call progress dialog begins with the following:

Calling you at "my home phone" (<phone address>) Please answer to complete call.

After the user answers, the example dialog switches to providing progress/station information regarding reaching the merchant:

Calling <merchant name> (when outcall is placed to merchant)

Connected to <merchant name> [agent <agent name>] (when merchant answers outcall)

Optionally, the agent's name is displayed to the user only if the merchant has configured this level of information to be revealed about an agent to users, wherein the configuration is stored in computer readable memory. Optionally, once the user answers the outcall some or all of the progress notifications are optionally also or instead provided via a message transmitted to the user's phone (e.g., via an SMS message, an MMS message, an audible message, etc.).

If the softswitch is queuing calls for the merchant (e.g., if the merchant agents are busy or unavailable), the progress notification may include the following, which is regularly/periodically updated:

All customer service representatives are busy, you are number <n> in queue, <m> minutes estimated wait time When a call is queued, the softswitch optionally periodically plays the foregoing notification with the same information, optionally with the user's placement number in the queue and wait time updated. In between playing of the notification, music or a merchant recorded prompt is optionally played in an example embodiment.

If the call is sent to a voice mail system (e.g., included in the softswitch or otherwise provided) so that a message can be recorded because the call was not answered, corresponding status information can be transmitted to the user (e.g., via the client application, a Web page, or a message transmitted to the user's phone). The following are example status notifications that can be transmitted and displayed to the user when the call is sent to voice mail:

No answer, leave a message

Recording message

Correspondingly, on the phone a prompt is played to the caller to record a message (e.g., "All our agents are busy, please leave a message, including your name and phone number, and an agent will call you back").

The call progress dialog allows the call to be canceled, optionally at any point, by clicking on a call terminate control displayed to the user via the client application user interface. For example, with reference to FIG. 6, an "End Call" control 602 can be provided, which when activated by the user, initiates call termination. Further, if the user hangs up the phone, the call will terminate. In addition, in busy and no answer situations, optionally the user is given the option to request that the call be retried by activating a retry control displayed to the user. Optionally, in addition or instead, the user can retry a call to the merchant by selecting the corresponding call log entry pertaining to the merchant and by clicking on a call initiation control (e.g., the "call now" button illustrated in FIG. 4).

When the call completes, a "call ended" notification is optionally displayed briefly before the call progress dialog automatically disappears. Optionally an "out" call appears in the caller call log.

If the user initiates a call outside of the merchant's standard business hours and the merchant has optionally defined an escalation phone address (e.g., wherein calls to the escalation phone address are answered over extended hours, such as between the hours of 6:00 PM and 9:00 AM), the user is optionally substantially immediately informed (e.g., via a pop-up notification displayed in the same dialog used for call progress notifications, via another interface, or via an audible message) of the option to escalate the attempt to access the merchant, possibly at additional cost (e.g., to the merchant and/or the user). If the user chooses to escalate the access attempt to the merchant, the call then optionally as similarly described with respect to a typical process as for a normal "click-to-talk", except the call is placed to the escalation phone address.

If the merchant is not available to take a call or if the call is on hold in a queue (e.g., waiting for a merchant agent to become available to take the call), the user is given the option to request camp-on, whereby the user is called back when the merchant has an agent available to speak with the user. This option is presented to the user in the call progress dialog, over the phone via a prerecorded via an interactive voice response system, or otherwise. Optionally, the call progress dialog also provides, via a scheduling user interface, the option of specifying a time (e.g., a range of times and/or dates) when the return call from the merchant should occur. By optional default, the return call is to the phone the user originally requested for the current call but the user is allowed to select a different phone via the dialog user interface or other user interface.

When a caller selects camp-on, if such an option is provided, the caller request is added to the queue in the softswitch, optionally including the time/date specified by the user as to when the call is to be returned. If no time is specified, the call is optionally put at the end of the queue, or at another designated queue position. If a time is specified, optionally the request is not inserted into the queue until that about time (e.g., slightly before the requested call back time), and the request is optionally inserted ahead of any, or selected calls that were queued since the camp-on request was received.

Once in the queue, servicing of a camp-on request is similar to a normal Click-To-Talk request, with the request being presented to an agent, the requester being called, and then the agent being connected.

When the return call is made and the user answers the called phone, an optional automated prompt informs the user that this is a call from the given merchant per the user's callback request. If the user happens to be running a client application that is federated/associated with the search provider or merchant, a visual call progress presentation is optionally provided via the client application with this call. Optionally, the softswitch does not provide any call progress information to the user in this case.

Figure 2A:
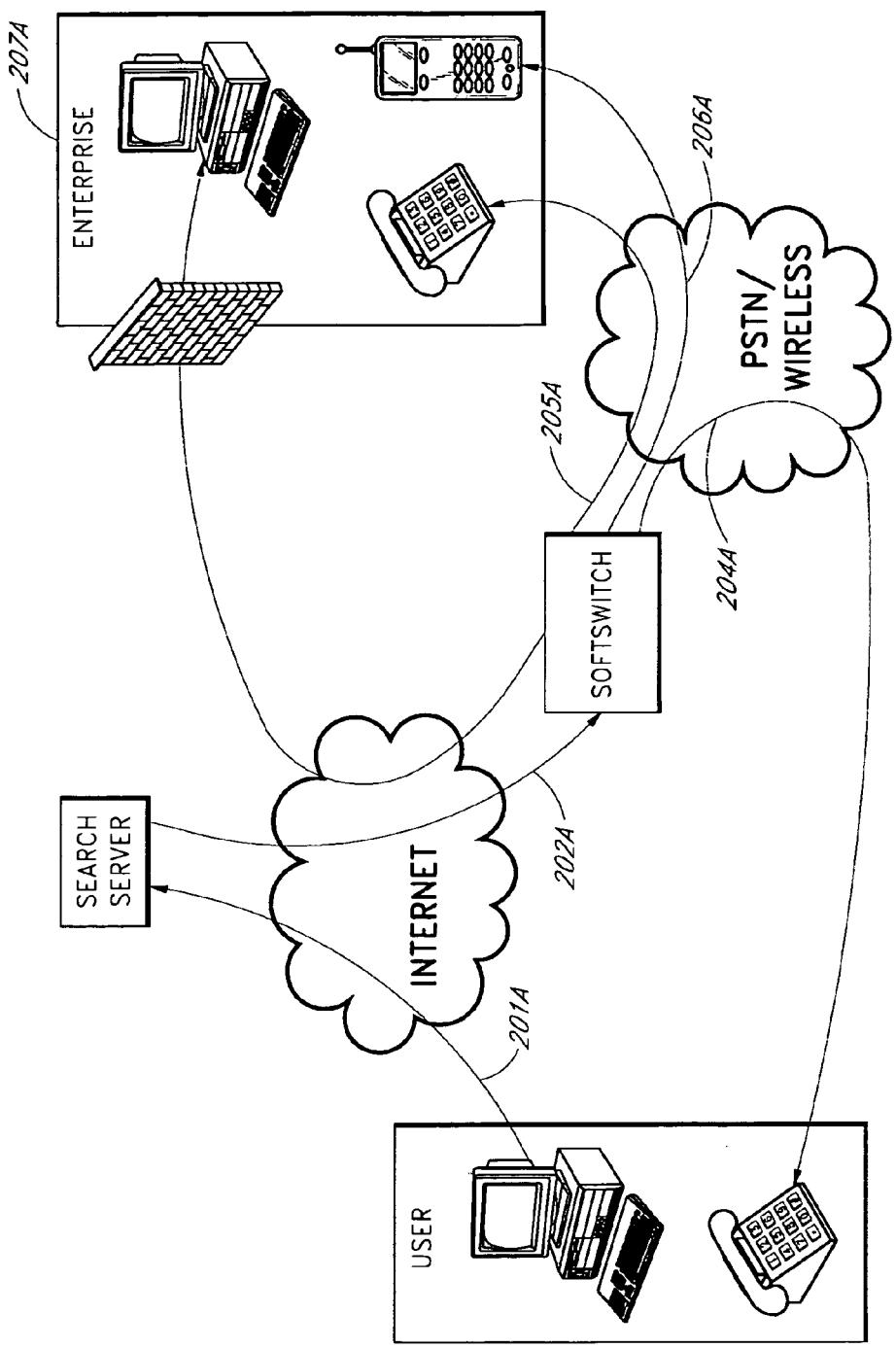
FIG. 2A illustrates a first example call handling process and system.

Referring now to FIG. 2A, at state 201A, the user activates a call initiation control (e.g., a click-to-talk control) associated with a merchant advertisement provided in connection with search results (e.g., clicks on a Click-To-Talk button). Then user selects (e.g., via a menu of telephone terminals/phone addresses associated with the user) which communication device the user wants to take the call with (e.g., via Google Talk, a SIP Federation address, a work landline number, a home landline number, a mobile number, etc.). In this example, the user requested that the call be placed to the user's landline. This request is received by a server, such as a Web search server (e.g., a search engine/server, such as that associated with Google, Yahoo!, Microsoft, or other search engine provider). The request to the server optionally includes, but is not limited to, some or all of the following: a merchant identifier, an advertisement identifier, the user's phone address, the user's web session IP address, the user's name and address, the user's telecommunications client account number if available, the user's presence, the user's location, the user's email address, the user's SMS address, etc. This information is optionally stored at the web server, requested to be entered by the user, stored in a cookie, or available in a client application (e.g., a telecommunication client) running on the user's network-based computer.

At state 202A, the server looks up the merchant (e.g., locates a corresponding merchant database record). In this example, a merchant record is located that indicates that the call request is directed to a merchant that has contracted to receive such calls. At least partly in response to the indication, the search provider server routes the call request to the softswitch. The call request can include merchant information (e.g., name, phone address), user information (e.g., name, email address, phone address), and the item clicked (e.g., name, URL).

Figure 7:
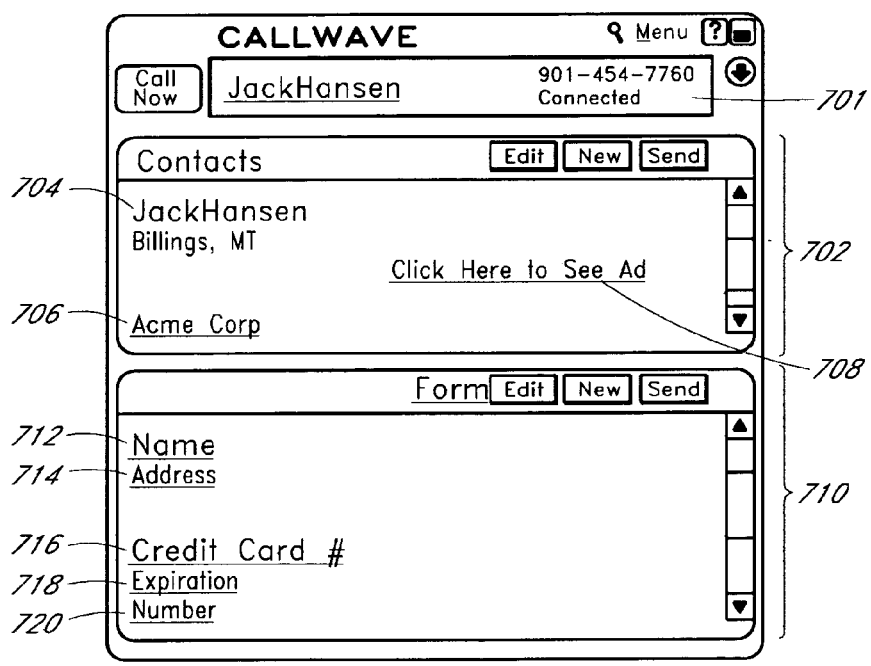
FIG. 7 illustrates an example telecommunication client used to display information related to a user that initiated a call.

With reference to state 207A, in this example, the merchant has chosen the option of using a telecommunications client application (such as that described above and of which an example user interface is illustrated in FIG. 7, although other clients and non-proprietary clients can be used as well) to receive calls. FIG. 7 illustrates an example telecommunication client used to display contact information about a user initiating a call 701,704, a merchant 706, an advertisement corresponding to the initiated call 708, and an example user/caller form that can be edited or completed by an agent 710.

In this example, the client is currently connected to the softswitch through a firewall protecting the merchant's local network. As can be seen in the example illustrated in FIG. 7, the information about the user is optionally displayed to give the merchant context and relevant information. For example, a first display area 701 (e.g., the top most pane) provides caller information (e.g., caller name, phone number, and call status (e.g., ringing, connected, terminated).

Another display area 702 (e.g., the middle pane) provides additional information about the user and the item that was clicked including but not limited to some or all of the following: the caller's name and/or location 704, phone number, calling network (e.g., cell, landline, VoIP), the merchant and/or products the user has expressed an interest in 706, and a link 708 to the web page viewed by the user (e.g., via the client's web pop capability). Another display area 710 (e.g., the bottom pane) can optionally include a fill-in form to be used by the agent to collect information from the user including but not limited to name, address, billing information, etc., using corresponding fields (e.g., a name field 712, and address field 714, a credit card or debit card field 716, an expiration date field 718, a security number field, 720, a free form field, etc.). Some or all of the fields may be prepopulated from a database storing information regarding the caller (e.g., obtained from a previous caller call, from a registration database, or otherwise).

Optionally, a merchant (e.g., an agent or representative of the merchant) can record notes regarding a conversation with the user, which is then stored in association with a call record. The name of the merchant representative/agent that spoke with the user, the phone address/extension of the agent and/or the time and day of the call is optionally automatically or manually entered into the call record. The call record further optionally includes some or all of the user information discussed above, the time and day the user activate the communication control, the name of the item that was clicked, and/or the page the user is currently viewing In this example, the user had called two days ago, so the information displayed optionally also includes notes from the previous call and the name of the agent that handled it.

With reference to state 204A, as discussed above, the user indicated that the user wants to utilize a landline phone (e.g., a POTs phone) for this call. Therefore, the softswitch dials the user specified landline via the PSTN (and/or via a VoIP network which is connected to a PSTN). While the softswitch is calling the user specified landline, a call progress indicator (e.g., a dialog including text and/or graphics) on the user's telecommunications client optionally shows that that the user is being called (e.g., "your home phone is being called" or "Calling you at <phone address>"), see FIG. 6 by way of example. At substantially the same time, the merchant's client application optionally indicates (e.g., via text and/or graphics) that the user is being called and further updates the call status when the user answers (e.g., "the call has been answered and is now in progress"). Once the user answers the call, the user's dialog changes to show progress on reaching the merchant (e.g., "thank you for answering the call, the merchant will now be called, and your called will be joined to the merchant call once the merchant answers" or "Calling <merchant name>").

With reference to state 205A, because this user called the merchant previously, in this example the softswitch attempts to connect to the same agent by dialing that agent's phone number via the PSTN (e.g., using the phone address retrieved from the call record or retrieved from another database using the agent name (or other identifier) stored in the call record as a search term). Optionally, if the same agent is not currently available (e.g., the agent is busy or is not working), a call center (e.g., an automatic call distribution system) would route the call to an available agent (e.g., in round robin fashion, randomly, or otherwise). The softswitch can provide information regarding the user (e.g., name, phone number, location, and/or other information) to the agent (e.g., via signaling information associated with the call/over the Internet, or otherwise). Some or all of the user's information is substantially immediately displayed on the client being used by the agent.

As the agent's phone rings, the user's dialog is updated and again when the agent answers (e.g., Connected to <merchant name>[agent <agent name>]). Optionally, the merchant can configure the audio that is to be played to the caller during ringback while connecting to an agent. For example, the audio selected by the merchant can be a mood adjusting music with an overlaid ring tone, or the audio can be a special announcement. The audio that is played as ringback is optionally distinct from the audio that is played while a call is queued.

With reference to state 206A, while talking with the user, in this example the agent realizes that another person in the company is needed to help answer a question. Therefore, the agent selects that person in the contact list displayed via the client application and requests that the person be added to the call. The softswitch responds by dialing the phone address associated with the selected contact and conferences the three phones together (e.g., bridges the outcalls to the user, the agent, and the selected party).

With reference to state 207A, when the call completes, the call is logged in the agent's client application and the call record is stored in computer readable memory on the agent terminal, a remote server, the softswitch, and/or other location. The agent can select the call record via the client application user interface, and optionally can edit certain fields and/or add a note about how the caller's request was handled.

With reference to state 205A above, optionally the merchant/agent can be called before calling the user or at substantially the same time the user is being called. The order of calling is optionally determined by the user or the merchant.

The scenario above sequences through an optional embodiment of a call initiation control (e.g., a click-to-talk control) associated with a merchant advertisement provided in connection with a search result. Optional embodiments enable a call to or from a merchant to automatically be initiated in response to one or more user specified trigger conditions being satisfied. For example, a user might be interested in a particular auction item or might be looking for a specific product within a certain price range. Via a web page control and/or via a telecommunication client application, the user can specify that a call is to be placed between the user and the merchants (optionally initiated from the merchant-side, from the user-side, or via the softswitch) when an item becomes available which meets certain user specified criteria such as make, model, price, age, etc. Optionally, the user can specify that such a call is to be placed only after ascertaining that the user is available or is likely to be available based on availability information provided by the user and/or the accessibility of one or more user telecommunications device (e.g., after checking one or more of the following: that the user's wireless phone is accessible via a wireless carrier; that the user's IP phone is online; that the current time of the day is within a user specified time/day range (e.g., during working hours, after working hours, during sleeping hours, not during sleeping hours, on weekend, not on a weekend, on a holiday, not on a holiday, etc.)). Example states described above can be transitioned in response to a triggering event defined by the user.

As illustrated in FIG. 2A, the search engine web server and softswitch communicate in real time to offer the "click-to-talk" service described herein. When a user clicks to make a call, data flows between the softswitch and search engine web server. The table below summarizes example data that is communicated with respect to the web server and softswitch. Optionally, there are also acknowledgements provided during the communication process.

TABLE 1

Data Flow

| Item | Source | Data |
| --- | --- | --- |
| Call Request | Web Server | Some or all of the following: Call ID, merchant ID, merchant name, call requester name, email address, phone address, name of item clicked, URL of page being viewed. In addition, optionally primary/secondary phone addresses of merchant's agents and other configuration information if the merchant is not separately registered with the service provider operating the softswitch. |
| Call Progress | Softswitch | Some or all of the Call ID plus the encoded call status: calling clicker, calling merchant, connected to merchant <agent name>, busy <queue position> <estimated time>, no answer, recording message, ended. The busy and no answer progress optionally may include an escalation option. |
| Escalation Request | Web Server | Call ID plus escalation phone address if kept by web server or other appropriate host. |
| Camp-On Request | Web Server | Call ID plus optional time for the return call. |

One or more protocols can be used to communicate the foregoing data. For example, SOAP (which can be used to exchange XML-based messages), COBRA, or other protocol can be used. The underlying transport protocol is optionally TCP/IP, by way of example, although other transport protocols can be used as well.

In the above example scenario, the merchant chose to use a client application (e.g., associated with the operator of the softswitch). If the client application had not been installed on the agent terminal, or if client application was not logged into the softswitch when the call from the softswitch arrived, the softswitch would use its knowledge of the phone addresses configured for the merchant to directly deliver the call to a merchant phone address.

For example, if there were more than one phone address configured for the merchant, such as a primary phone address and a secondary phone address (e.g., wherein the primary phone address is a Google Talk client address, and the secondary address is associated with a mobile phone), the primary address (e.g., the merchant's Google Talk client or other designated address) would be called first. If the call was not answered within a configured interval (e.g., a certain period of time, such as 10 seconds, or a certain number of rings, such as 4 rings), the softswitch would substantially start calling the second phone address (e.g., the merchant's mobile phone) while still ringing the primary address.

Optionally, the first of the calls to be answered would get the call and the call to the still unanswered phone address would be dropped. Optionally, if both calls were answered (to the primary and secondary phone addresses), the calls to the user, the primary phone address, and the secondary call address would be conferenced together. Optionally, prior to calling the secondary phone address, the call to the primary phone address is dropped.

If no one answered the calls to the merchant phone addresses, the caller would be prompted to leave a message that would then be stored in computer readable memory. A notification regarding the message can be provided to one or more agents (e.g., via a call log displayed in the client application, an SMS message, an email message, etc.) who could then retrieve and playback the recorded message. While the call was in progress, the Merchant would have the option of transferring the call or conferencing in other people (e.g., to help answer the caller's question).

As similarly discussed above, a merchant, by way of example, can be an individual proprietor, a small business with multiple employees, or a larger corporation or other entity. As similarly discussed elsewhere herein, a merchant may be associated with agents that answer user calls placed via online advertisements. Depending on the size of the business, agents may be dedicated to answering calls or the agent may have other duties as well. In the case of an individual proprietor, the merchant may also be the agent. An agent may or may not be co-located with the rest of the business. An agent may be mobile. An agent may be an employee of the merchant, the agent may be an independent contractor, or the agent may be an employee of call center service provider or other employer.

Figure 2B:
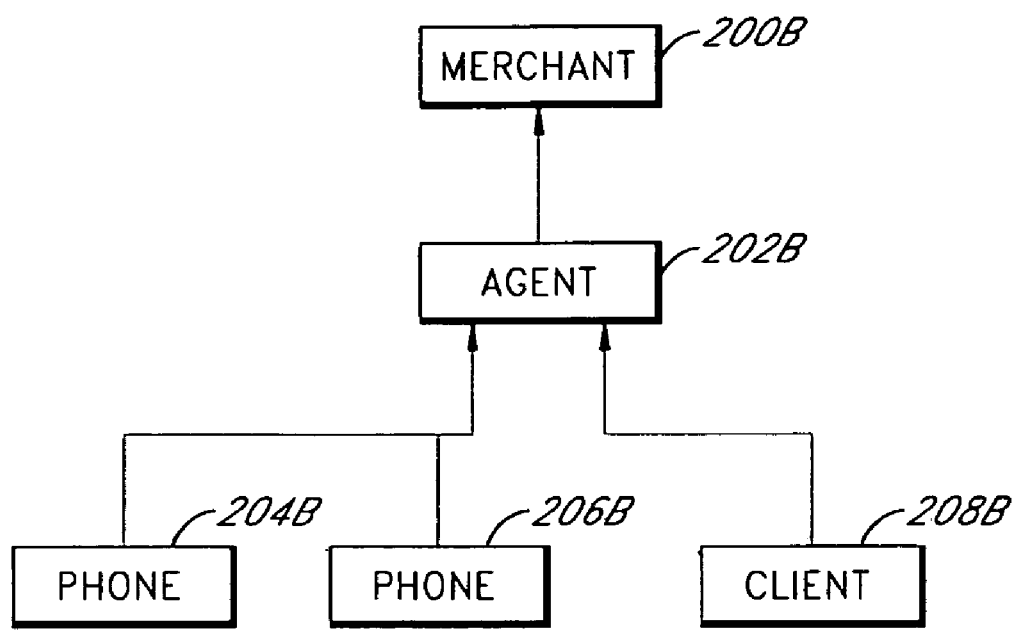
FIG. 2B illustrates an example system configuration of a call recipient.

With reference to FIG. 2B, a merchant 200 can configure call processes for one or more agents 202B. An agent 202B can have a primary phone 204B and an optional secondary phone 206B (e.g., a mobile, landline, or VoIP phone) known to the softswitch for delivering calls (e.g., stored in a database record associated with the agent). An agent can also be equipped with a proprietary or non-proprietary telecommunications client 208B, which maintains a connection with the softswitch. The softswitch can announce calls via the agent's telecommunications client 208B when the client is online and in communication with the softswitch.

By way of example and not limitation, one or more of the following phone address can be associated with and configured for an agent:

Google Talk client on the agent's terminal
SIP Federation addressable phone
Landline Work PSTN-based phone
Home Work PSTN-based phone
Mobile phone
Phone behind a PBX/Auto-Attendant, i.e., with a dialable extension The merchant can configure whether all, or a selected subset of agents are to be notified of a user call (e.g., a user initiated via a user clicked on an advertisement control) simultaneously, serially, or in round robin, least-idle, most idle fashion, by way of examples. The call routing can be performed by the softswitch, a separate call center, or otherwise. Call presentation can optionally be via phones only or call presentation can include use of a computer-based client, such as the telecommunications client discussed herein. When round robin delivery is configured on the softswitch or other call center, and the call is from a previous caller, as recognized by the caller's phone address, an attempt is made to deliver the call to the agent that handled the previous call (e.g., wherein the agent is identified via a call record associated with the calling phone number). If that agent is not available, regular round robin delivery or other hunting options are optionally applied. With round robin, optionally a new call is not presented to an agent if they are already servicing a call.

If agents are notified simultaneously of the call by the softswitch or other call center, and more than one agent answers, optionally, all agents that answered are conferenced together with the caller; or the service can be configured to have the first agent that answers get the call and the other agents are informed (e.g., via the client application, via a voice announcement played via the agent telephone, or otherwise) that someone else took the call.

In addition, optionally a merchant can configure how calls are to be handled when no agents are immediately/currently available to answer the call. Merchant configuration choices can be stored in a database in association with a merchant identifier. For example, the database can be included in or accessible to the softswitch or a separate call center. The merchant can optionally specify configuration choices via a form, such as a Web page form, transmitted over a network to a merchant computer. The choices optionally include one or more of:

Take a message

If round robin or another hunting method of presentation is configured and all agents are busy with a call, either queue the call with an announcement to the caller (e.g., a text message displayed on the caller client application or a message audibly played to the caller via the caller phone, such as "all agents are currently busy, your call will be answered by the next available agent"), or take a message from the caller (e.g., via a voice mail system). The announcement can be configured to give the caller the option of requesting camp-on (an automatic call back to the caller when an agent becomes available).

If it is an out-of-hours situation and an escalation procedure is configured, the escalation option is presented to the caller (e.g., via a client application hosted on the caller's computer terminal or via a voice prompt delivered to the caller's phone), along with any configured additional cost information. If the caller chooses to go ahead with the escalation, a call is made to the configured escalation phone address and the caller is charged an applicable escalation fee, if any.

If a call is presented to a specific agent's phone, but no explicit call action is taken by that agent (e.g., the agent's phone rings but is not answered), the call optionally automatically rolls over to the next available agent after predetermined number of rings or after a configured interval of attempting to connect to the original agent.

As similarly discussed above, optionally, an agent can have a one or more alternate/secondary phone addresses (e.g., a mobile phone number, a home phone number, etc.). If the call to the agent's primary address is not answered within a configured interval (e.g., a time interval or after a certain number of rings), the agent's secondary address is called while the ringing of the primary phone address is still in progress. In another example embodiment, one or more phone addresses are called simultaneously or sequentially. Optionally, if there is no answer at either phone address, the agent is considered unavailable and the call rolls over to another agent or a message is taken and stored in computer readable memory, depending on the specified configuration.

As similarly discussed above, a merchant can elect to equip agents with one or more instances of a telecommunications client hosted on corresponding terminals, which can be used to visually present call information and to provide certain call handling functions. When a call arrives for an agent, it is substantially immediately announced via the client application. Some or all of the following information is optionally presented (e.g., wherein the information is transmitted by the softswitch to the agent):

Caller name, if known

Caller phone address, if not private

Caller email address, if known

Name of item that was clicked

Web page the caller is viewing, if accessible

A call history to the merchant, if any, for this caller, including the identification of the agent(s) that handled the previous call(s) and associated notes, if any As the call progresses, the client application display is updated to reflect the current call status.

After viewing the call information, the agent can indicate that the agent wants to preview the call. The softswitch then voice prompts the caller to leave a message. As the caller leaves a message, the message is recorded and is streamed in substantially real time to the agent's client application or other communication device. This enables the agent to listen to and screen the caller before deciding to take the call. The agent's client application can be configured to automatically preview calls without an agent gesture. If the agent is previewing the call via an agent phone, the agent can provide an appropriate command (e.g., by pressing the "1" key on the agent's phone) to take the call on the phone.

The agent's client application can be configured to display one or more phone addresses associated with the agent and/or with other agents. The agent can specify (e.g., via a menu displaying the configured phone addresses) on which phone the agent wants to take the call or to where the phone is to be transferred (e.g., to another agent). One of the configured phone addresses is optionally set as the default, wherein the default is stored in computer readable memory. When a phone is selected for use, the softswitch delivers the call to the selected phone. If no selection is made within a configured interval or after a certain number of rings, the call is automatically delivered to the default phone.

If the call is taken on the primary or secondary phone of the agent, the call continues to remain active in the agent's telecommunication client, with the client showing the current call status so that the agent can take additional action.

Optionally, after taking a call, the agent can transfer the call or conference in another person. For example, the agent may need to leave the office and continue the conversation while mobile, or the agent may need another employee or agent to help solve the caller's problem. The phone address to which the call is to be transferred or conferenced with is optionally selected from the agent's contact list (e.g., accessed via the agent's client application). The agent can also manually enter a specific phone address into a call transfer/conference field presented via the client application.

After the agent chooses a call transfer/conference phone address, the selected phone/phone address is called. When the call at the selected address is answered, the caller, agent, and additional person at the selected phone address are conferenced together. The call conference can be temporary, wherein it turns into a call transfer when the agent hangs up the agent's phone, or if all parties remain on the call, a call conference results. Additional people can be similarly conferenced in.

The agent can optionally also initiate a call transfer or call conference via the agent's phone (e.g., by pressing the "2" key and then entering or selecting a call transfer address) while screening a call or during a full duplex call.

As previously discussed, by optional default, a call transfer is to another of the agent's phones. If the agent has multiple phones configured (e.g., in the agent's client application for taking calls), after pressing 2 (or performing other specified action) the agent has the option of providing another keypress to select from that list, or they can enter a phone number.

Optionally, at a desired point, including after taking the call, the agent can send an active call to voice mail to take a message. The call is then no longer displayed in the client application as an active call and the agent is ready for another incoming call.

Calls to the merchant are logged in the softswitch and/or other designated data store. Calls to the agent are also optionally automatically logged in the agent's client application for future reference. New calls in the log are optionally highlighted or emphasized until action is taken to review them.

A call in the log can be manually deleted. A message associated with a call can be played. A call log can optionally be edited to enter notes specific to the call. These notes are optionally stored in the softswitch so they can be referenced by other agents. As similarly discussed above, optionally, the agent's client application stores a list of the agent's contacts. The contact information optionally includes the contact name, postal address, email address, and/or phone address (es). The contact list and/or call log can be used by the agent when making or transferring calls by selecting a contact list or call log entry and activating a call control.

As similarly discussed above, an agent can have multiple instances of the client application (e.g., at work and at home). In a shared computer environment, optionally multiple instances of the client application are provided on the same computer in separate user domains (e.g., in separate operating system user domains, such as those offered via Windows XP, Windows Vista, OS X, Unix, Linux, etc).

The client application is optionally configured to access the softswitch even if the merchant has a corporate firewall in place, without compromising the integrity of the firewall or requiring any manual adjustments on the part of the merchant.

As similarly discussed above, if merchant does not have an agent available to take a call or if call preview is configured, or the call is not answered by an agent for other reasons, the caller is optionally prompted to leave a message. The message recorded is accessible (e.g., by email, download, or streaming) via an agent client application or a via a phone message review client. In both clients, an indication is optionally provided indicating whether a message has been reviewed, or if the message is new and/or has not been reviewed.

The voice mail greeting that is played to the caller is a default system greeting, a spoken name greeting, or a personalized greeting depending on how the merchant's greeting configuration. The greeting is recorded using the phone message review client, the client application, or otherwise.

An agent has the option of being notified of missed calls via email, SMS, or stutter dial tone on their primary phone. An email notification optionally may include any recorded message.

Thus, certain embodiments described herein provide methods and systems for providing real-time call progress updates to callers via their computer or other device.

It should be understood that certain variations and modifications of this invention would suggest themselves to one of ordinary skill in the art. The scope of the present invention is not to be limited by the illustrations or the foregoing descriptions thereof.

What is claimed is:

1. A method of processing a call request paced via a Web page user interface, the method comprising:

causing, at least in part, a first telephonic address to be visually provided via a Web page in association with search results transmitted to a networked computing device associated with a user, wherein the search results were transmitted at least partly in response to a user search request to a search engine;

receiving at a call processing system a first call to the first telephonic address from the user via a mobile telephonic device;

placing a second call to a second telephonic address associated with the first telephonic address;

bridging the first call and the second call;

after the first call is received, transmitting over a data network to a client application, at least in part, the Web page, including at least a portion of the search results, wherein the search results were transmitted to the networked computing device associated with the user prior to the first call, to a networked computing device for display to a party that answers the second call;

transmitting, at least in part, information associated with the first telephonic address to be displayed via the networked computing device associated with the party that answers the second call;

transmitting information regarding a dynamically determined location of the user, without manual provision of the location by the user, to the networked computing device associated with the party that answers the second call; and transmitting, at least in part, an SMS address associated with the mobile telephonic device to the networked computing device associated with the party that answers the second call;

transmitting progress information related to the second call to the user computer system in substantially real-time.

2. The method as defined in claim 1, the method further comprising transmitting call progress information related to the second call via the Internet to the networked computing device associated with the user.

3. The method as defined in claim 2, wherein the call progress information indicates that the second call is being placed, but has not yet been answered.

4. The method as defined in claim 2, wherein the call progress information indicates that the second call is answered.

5. The method as defined in claim 2, wherein the call progress information indicates that the second call is queued.

6. The method as defined in claim 2, wherein the call progress information indicates that the second call is being placed to a named merchant.

7. The method as defined in claim 1, the method further comprising providing call queue position information and/or an estimated queue wait time to the user.

8. The method as defined in claim 1, the method further comprising providing a user interface to the user if the second call is not answered within a first period of time or after a first number of rings, via which the user can indicate that a callback call to the user is to be placed during a user-specified time.

9. The method as defined in claim 1, the method further comprising providing a menu of user telephonic destinations to the user via which the user can indicate to which of the user telephonic destinations a third call is to be placed, wherein the menu is provided at least partly in response to a user activating a control associated with an advertisement displayed with a plurality of search result items.

10. The method as defined in claim 9, wherein the menu includes two or more telephonic destinations including at least one of the following telephonic destinations:

a wireless telephonic device address;

a landline telephonic address; or a telephonic address associated with a packet network.

11. The method as defined in claim 1, wherein activation of a first call control causes, at least in part, the first telephonic address to be transmitted to a computer system associated with the search engine.

12. The method as defined in claim 1, the method further comprising causing, at least in part, information regarding an advertisement associated with a first call control to be displayed via a networked computing device associated with the party that answers the second call.

13. The method as defined in claim 1, the method further comprising causing, at least in part, a user interface to be provided to the party that answers the second call, via which the party can provide a call transfer instruction and/or a call conference instruction.

14. The method as defined in claim 1, wherein a first call control is displayed in association with a merchant advertisement, wherein the merchant is charged for the merchant advertisement and/or the placing of a call resulting from activation of the first call control.

15. The method as defined in claim 14, wherein the first call control includes an embedded Session Internet Protocol address.

16. A method of processing a call request, the method comprising:
receiving over a network a call request placed by a user via a call control visually presented on a user terminal in association with search results,
wherein the search results were transmitted to the user at least partly in response to a search request, and
wherein the call request indicates that a call is to be placed;
placing a first call to a first telephonic destination, the first telephonic destination specified by the user, at least partly in response to receiving the call request;
placing a second call to a telephonic address different than the first telephonic destination, wherein the telephonic address is associated with the search request;
transmitting call progress information related to the second call to the user terminal in substantially real-time;
bridging the first call and the second call;
transmitting at least a portion of the search results to a networked computing device for display to a party that answers the second call;
transmitting information associated with the first telephonic address to be displayed via the networked computing device associated with the party that answers the second call;
transmitting information regarding a dynamically determined location of the user, obtained without manual provision of the location by the user, to the networked computing device associated with the party that answers the second call; and
transmitting, at least in part, an SMS address associated with a mobile telephonic device of the user to the networked computing device associated with the party that answers the second call.

17. The method as defined in claim 16, wherein the first telephonic destination is specified by the user during a Web session.

18. The method as defined in claim 16, wherein the first telephonic destination is specified by the user prior to placement of the search request.

19. The method as defined in claim 16, wherein the call progress information is transmitted over the Internet to the user terminal.

20. The method as defined in claim 16, wherein the first telephonic destination is specified by the user by placing a call from the first telephonic destination to a first system.

21. The method as defined in claim 16, wherein the call progress information indicates that the second call is being placed, but has not yet been answered.

22. The method as defined in claim 16, wherein the call progress information indicates that the second call is answered.

23. The method as defined in claim 16, wherein the call progress information indicates that the second call is queued.

24. The method as defined in claim 16, wherein the call progress information indicates the termination of the first call and/or the second call.

25. The method as defined in claim 16, wherein the call progress information indicates that the second call is being placed to a named merchant.

26. The method as defined in claim 16, the method further comprising providing call queue position information and/or an estimated queue wait time to the user.

27. The method as defined in claim 16, the method further comprising providing a user interface to the user if the second call is not answered within a first period of time or after a first number of rings via which the user can indicate that a callback call is to be placed to the user.

28. The method as defined in claim 16, the method further comprising providing a user interface to the user if the second call is not answered within a first period of time or after a first number of rings, via which the user can indicate that a callback call to the user is to be placed during a first user-specified time.

29. The method as defined in claim 16, wherein the first telephonic destination is a telephone address.

30. The method as defined in claim 16, the method further comprising providing a menu of telephonic destinations to the user via which the user can indicate to which telephonic destinations the first call is to be placed.

31. The method as defined in claim 30, wherein the menu includes a plurality of telephonic destinations and enables the user to select at least one of:
a wireless telephonic device;
a landline telephonic device; or
a telephonic device configured to communicate over a packet network.

32. The method as defined in claim 16, wherein the telephonic destination is selected by the user as a default telephonic destination.

33. The method as defined in claim 16, wherein activation of the call control causes, at least in part, the telephonic address associated with the telephonic destination selected by the user to be transmitted to a computer system associated with the search engine.

34. The method as defined in claim 16, wherein the first call is placed to the user terminal.

35. The method as defined in claim 16, wherein the second call is placed before the first call.

36. The method as defined in claim 16, the method further comprising causing, at least in part, a Web page being displayed to the user to be displayed via the networked computing device associated with the party that answers the second call.

37. The method as defined in claim 16, the method further comprising causing, at least in part, the user's name to be displayed via the networked computing device associated with the party that answers the second call.

38. The method as defined in claim 16, the method further comprising causing, at least in part, information regarding an advertisement associated with the call control to be displayed via the networked computing device associated with the party that answers the second call.

39. The method as defined in claim 16, the method further comprising causing, at least in part, a user interface to be provided to the party that answers the second call, via which the party can provide a call transfer instruction and/or a call conference instruction.

40. The method as defined in claim 16, wherein the call control is displayed in association with a merchant advertisement, wherein the merchant is charged for the merchant advertisement and/or the placing of the first call and/or the second call.

41. The method as defined in claim 16, wherein the search results and the call control are presented via a Web page.

42. The method as defined in claim 16, wherein the call control includes an embedded Session Internet Protocol address.

43. The method as defined in claim 16, wherein the party answering the second call can audibly screen the call as the user leaves a message.

44. The method as defined in claim 16, wherein the party answering the second call can transfer the second call to a specified telephonic destination.

45. A call processing system, including one or more computing devices, the call processing system configured to perform operations:
   causing, at least in part, a first telephonic address to be visually provided via a Web page in association with search results transmitted to a networked computing device associated with a user, wherein the search results were transmitted at least partly in response to a user search request to a search engine;
   receiving a first call to the first telephonic address from the user via a mobile telephonic device;
   placing a second call to a second telephonic address associated with the first telephonic address;
   bridging the first call and the second call;
   after the first call is received, transmitting over a data network to a client application, at least in part, the Web page, including at least a portion of the search results, wherein the search results were transmitted to the networked computing device associated with the user prior to the first call, to a networked computing device for display to a party that answers the second call;
   transmitting, at least in part, information associated with the first telephonic address to be displayed via the networked computing device associated with the party that answers the second call;
   transmitting information regarding a dynamically determined location of the user, without manual provision of the location by the user, to the networked computing device associated with the party that answers the second call;
   transmitting, at least in part, an SMS address associated with the mobile telephonic device to the networked computing device associated with the party that answers the second call; and
   transmitting progress information related to the second call to the user computer system in substantially real-time.

46. The call processing system as defined in claim 45, the operations further comprising transmitting call progress information related to the second call via the Internet to the networked computing device associated with the user.

47. The call processing system as defined in claim 46, wherein the call progress information indicates, in substantially real-time, that:
   the second call is being placed, but has not yet been answered, or
   that the second call is answered, or
   that the second call is queued, or
   that the second call is being placed to a named merchant.

48. The call processing system as defined in claim 45, the operations further comprising providing call queue position information and/or an estimated queue wait time to the user.

49. The call processing system as defined in claim 45, the operations further comprising providing a user interface to the user if the second call is not answered within a first period of time or after a first number of rings, via which the user can indicate that a callback call to the user is to be placed during a user-specified time.

50. The call processing system as defined in claim 45, the operations further comprising providing a menu of user telephonic destinations to the user via which the user can indicate to which of the user telephonic destinations a third call is to be placed, wherein the menu is provided at least partly in response to a user activating a control associated with an advertisement displayed with a plurality of search result items.

51. The call processing system as defined in claim 45, wherein activation of a first call control causes, at least in part, the first telephonic address to be transmitted to a computer system associated with the search engine.

52. The call processing system as defined in claim 45, the operations further comprising causing, at least in part, information regarding an advertisement associated with a first call control to be displayed via a networked computing device associated with the party that answers the second call.

53. The call processing system as defined in claim 45, the operations further comprising causing, at least in part, a user interface to be provided to the party that answers the second call, via which the party can provide a call transfer instruction and/or a call conference instruction.

54. The call processing system as defined in claim 45, wherein a first call control is displayed in association with a merchant advertisement, wherein the merchant is charged for the merchant advertisement and/or the placing of a call resulting from activation of the first call control.

55. The call processing system as defined in claim 54, wherein the first call control includes an embedded Session Internet Protocol address.

56. A call processing system, including one or more computing devices, the call processing system configured to perform operations comprising:
   receiving over a network a call request placed by a user via a call control visually presented on a user terminal in association with search results,
   wherein the search results were transmitted to the user at least partly in response to a search request, and
   wherein the call request indicates that a call is to be placed;
   placing a first call to a first telephonic destination, the first telephonic destination specified by the user, at least partly in response to receiving the call request;
   placing a second call to a telephonic address different than the first telephonic destination, wherein the telephonic address is associated with the search request;
   transmitting call progress information related to the second call to the user terminal in substantially real-time;
   bridging the first call and the second call;
   transmitting at least a portion of the search results to a networked computing device for display to a party that answers the second call;
   transmitting information associated with the first telephonic address to be displayed via the networked computing device associated with the party that answers the second call;
   transmitting information regarding a dynamically determined location of the user, obtained without manual provision of the location by the user, to the networked computing device associated with the party that answers the second call; and
   transmitting, at least in part, an SMS address associated with a mobile telephonic device of the user to the networked computing device associated with the party that answers the second call.

57. The call processing system as defined in claim 56, wherein the first telephonic destination is specified by the user during a Web session.

58. The call processing system as defined in claim 56, wherein the first telephonic destination is specified by the user prior to placement of the search request.

59. The call processing system as defined in claim 56, wherein the call progress information is transmitted over the Internet to the user terminal.

60. The call processing system as defined in claim 59, wherein the call progress information indicates, in substantially real-time, that:
- the second call is being placed, but has not yet been answered, or
- that the second call is answered, or
- that the second call is queued, or
- that the second call is being placed to a named merchant, or
- the termination of the first call and/or the second call.

61. The call processing system as defined in claim 56, the operations further comprising providing a user interface to the user if the second call is not answered within a first period of time or after a first number of rings via which the user can indicate that a callback call is to be placed to the user.

62. The call processing system as defined in claim 56, the operations further comprising providing a user interface to the user if the second call is not answered within a first period of time or after a first number of rings, via which the user can indicate that a callback call to the user is to be placed during a first user-specified time.

63. The call processing system as defined in claim 56, the operations further comprising providing a menu of telephonic destinations to the user via which the user can indicate to which telephonic destinations the first call is to be placed.

64. The call processing system as defined in claim 56, wherein activation of the call control causes, at least in part, the telephonic address associated with the telephonic destination selected by the user to be transmitted to a computer system associated with the search engine.

65. The call processing system as defined in claim 56, the operations further comprising causing, at least in part, a Web page being displayed to the user to be displayed via the networked computing device associated with the party that answers the second call.

66. The call processing system as defined in claim 56, the operations further comprising causing, at least in part, information regarding an advertisement associated with the call control to be displayed via the networked computing device associated with the party that answers the second call.

67. The call processing system as defined in claim 56, wherein the call control is displayed in association with a merchant advertisement, wherein the merchant is charged for the merchant advertisement and/or the placing of the first call and/or the second call.

\* \* \* \* \*